United States Patent
Dry et al.

(10) Patent No.: US 10,961,065 B2
(45) Date of Patent: Mar. 30, 2021

(54) METHOD OF LOADING COMPONENTS INTO A VEHICLE

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/447,264

(22) Filed: Jun. 20, 2019

(65) Prior Publication Data
US 2020/0399080 A1    Dec. 24, 2020

(51) Int. Cl.
| | | |
|---|---|---|
| *B65G 67/20* | (2006.01) | |
| *B60P 3/42* | (2006.01) | |
| *B60N 2/005* | (2006.01) | |

(52) U.S. Cl.
CPC .............. *B65G 67/20* (2013.01); *B60P 3/423* (2013.01); *B60N 2/005* (2013.01)

(58) Field of Classification Search
CPC ......... B60P 3/423; B60N 2/005; B65G 67/20; B65G 67/00; B64C 1/22; B64C 1/20
See application file for complete search history.

(56) References Cited

U.S. PATENT DOCUMENTS

| | | | | | |
|---|---|---|---|---|---|
| 3,279,631 | A | * | 10/1966 | McCartney | B65G 67/00 414/532 |
| 3,381,921 | A | * | 5/1968 | McDonough | B64D 9/003 410/79 |
| 3,666,127 | A | * | 5/1972 | Guyaux | B66F 7/0625 414/495 |
| 3,885,685 | A | * | 5/1975 | Montgomery | B64F 1/32 414/391 |
| 3,972,427 | A | * | 8/1976 | Stanley | B60P 1/02 244/137.1 |
| 4,210,355 | A | * | 7/1980 | Legueu | A61G 3/001 296/19 |
| 4,699,337 | A | * | 10/1987 | Lewis | B64D 9/00 244/137.1 |
| 4,780,043 | A | * | 10/1988 | Fenner | B64C 1/20 198/316.1 |
| 5,090,639 | A | * | 2/1992 | Miller | B64D 9/00 244/118.1 |
| 5,911,465 | A | | 6/1999 | Yamamoto et al. | |
| 6,808,356 | B2 | * | 10/2004 | Iwasaki | B60P 1/52 193/35 SS |

(Continued)

FOREIGN PATENT DOCUMENTS

| | | |
|---|---|---|
| DE | 102015216171 A1 | 3/2017 |
| FR | 2836109 A1 | 2/2002 |

*Primary Examiner* — Kaitlin S Joerger
(74) *Attorney, Agent, or Firm* — David Coppiellie; Price Heneveld LLP

(57) ABSTRACT

A method of loading components into a vehicle includes the steps of opening an access door to gain access to a cabin of the vehicle, actuating a lift assembly to the open access door, securing the lift assembly to a portion of the cabin of the vehicle, and transferring the components to be loaded into the vehicle from the lift assembly to the cabin of the vehicle. The lift assembly is provided with the components to be loaded into the vehicle.

20 Claims, 19 Drawing Sheets

(56) References Cited

U.S. PATENT DOCUMENTS

| | | | |
|---|---|---|---|
| 6,923,606 B2 * | 8/2005 | Fehrle | A61G 1/06 |
| | | | 211/173 |
| 7,367,528 B2 * | 5/2008 | Allison, Sr. | B64D 11/00 |
| | | | 244/118.6 |
| 7,677,629 B2 | 3/2010 | Akiya et al. | |
| 9,019,719 B2 * | 4/2015 | Tomasi | B64D 43/00 |
| | | | 361/807 |
| 9,452,901 B2 * | 9/2016 | Panzram | B65G 67/00 |
| 9,738,402 B2 * | 8/2017 | Brown | B64D 9/00 |
| 9,956,126 B2 * | 5/2018 | Russell | A61G 3/00 |
| 10,292,798 B2 * | 5/2019 | Lampe | B64C 1/20 |
| 2004/0173723 A1 * | 9/2004 | Looker | B64D 9/003 |
| | | | 248/346.02 |
| 2013/0200123 A1 | 8/2013 | Orozco et al. | |
| 2016/0221472 A1 | 8/2016 | Deshmukh | |
| 2018/0133074 A1 | 5/2018 | Delise et al. | |

* cited by examiner

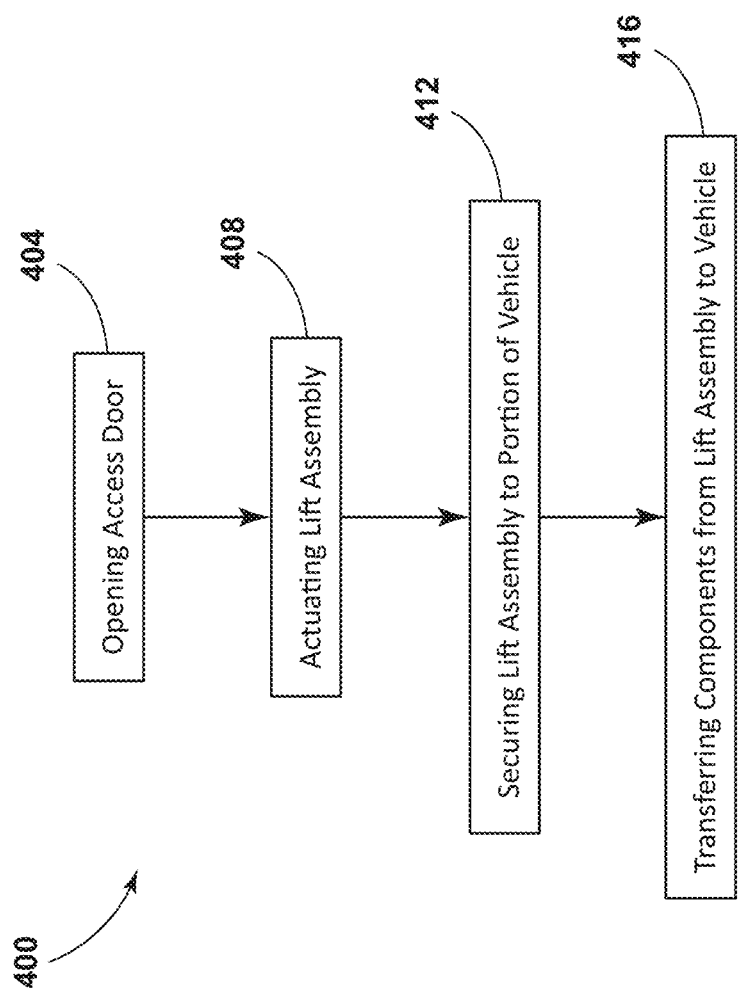

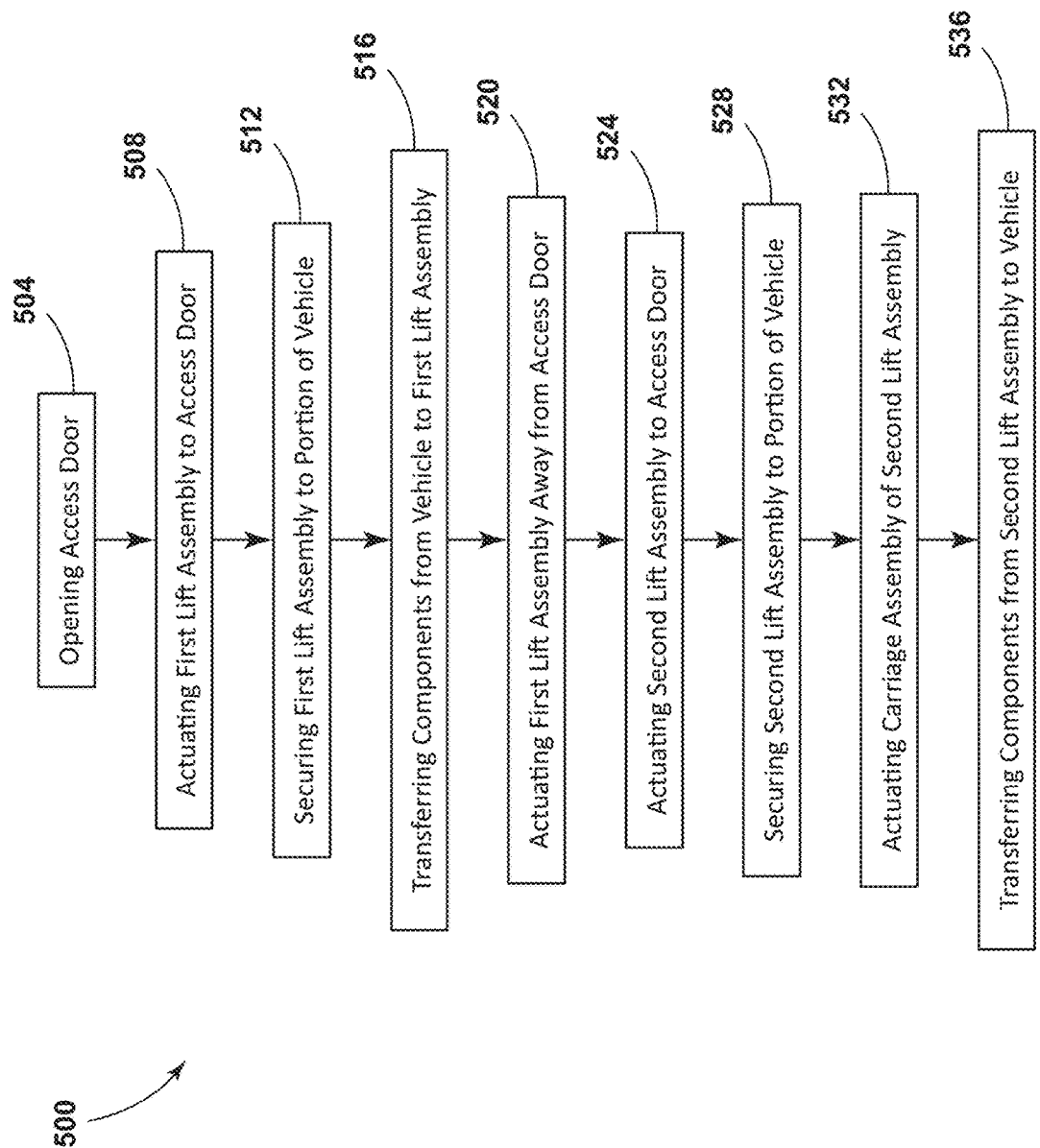

METHOD OF LOADING COMPONENTS INTO A VEHICLE

FIELD OF THE DISCLOSURE

The present disclosure generally relates to a vehicle. More specifically, the present disclosure relates to a method of loading components into a vehicle.

BACKGROUND OF THE INVENTION

Vehicles are typically provided with one or more components. Consumers often desire a degree of personalization within their vehicles, such as with the components provided therein. Accordingly, additional solutions are needed that can provide users of the vehicle with a degree of personalization.

SUMMARY OF THE INVENTION

According to a first aspect of the present disclosure, a method of loading components into a vehicle includes the steps of opening an access door to gain access to a cabin of the vehicle, actuating a lift assembly to the open access door, securing the lift assembly to a portion of the cabin of the vehicle, and transferring the components to be loaded into the vehicle from the lift assembly to the cabin of the vehicle. The lift assembly is provided with the components to be loaded into the vehicle Embodiments of the first aspect of the present disclosure can include any one or a combination of the following features:
- the step of transferring the components to be loaded into the vehicle from the lift assembly to the cabin of the vehicle further includes the step of actuating a carriage assembly relative to a platform of the lift assembly;
- the step of transferring the components to be loaded into the vehicle from the lift assembly to the cabin of the vehicle further includes the step of actuating the components to be loaded into the cabin of the vehicle along storage tracks of the carriage assembly;
- the step of transferring the components to be loaded into the vehicle from the lift assembly to the cabin of the vehicle further includes the step of aligning storage tracks of the carriage assembly with a rail assembly of the cabin of the vehicle;
- the step of actuating a carriage assembly relative to a platform of the lift assembly further includes the step of guiding the actuation of the carriage assembly relative to the platform with guide rails of the platform;
- the step of transferring the components to be loaded into the vehicle from the lift assembly to the cabin of the vehicle further includes the step of transferring the components to be loaded into the vehicle from storage tracks of the lift assembly to at least one track of a rail assembly of the cabin of the vehicle;
- the step of transferring the components to be loaded into the vehicle from the lift assembly to the cabin of the vehicle further includes the step of engaging one or more of the components to be loaded into the vehicle with a drive cable of a rail assembly in the cabin of the vehicle;
- the step of securing the lift assembly to a portion of the cabin of the vehicle further includes the step of inserting a locking pin into a receptacle on a landing pad of a rail assembly of the cabin of the vehicle;
- the step of securing the lift assembly to a portion of the cabin of the vehicle further includes the step of connecting the lift assembly to a power supply of the vehicle;
- the step of transferring the components to be loaded into the vehicle from the lift assembly to the cabin of the vehicle further includes the step of transferring the components to be loaded into the vehicle directly onto longitudinal tracks of the cabin of the vehicle;
- the step of securing the lift assembly to a portion of the cabin of the vehicle further includes the step of connecting the lift assembly to a data transfer point of the vehicle;
- the step of connecting the lift assembly to a data transfer point of the vehicle includes the step of reading an electronic data tag of the lift assembly; and
- the step of reading an electronic data tag of the lift assembly includes the step of referencing the components to be loaded into the vehicle against an assigned configuration for the vehicle.

According to a second aspect of the present disclosure, a method of exchanging components of a vehicle includes the steps of opening an access door to gain access to a cabin of the vehicle, actuating a first lift assembly to the open access door by movement of the first lift assembly in at least one of a horizontal and a vertical direction, securing the first lift assembly to a landing pad of a rail assembly of the cabin of the vehicle, transferring one or more components to be removed from the cabin of the vehicle from the rail assembly in the cabin of the vehicle to the first lift assembly through the open access door, actuating the first lift assembly to a location that is removed from an immediate proximity of the opened access door of the vehicle, actuating a second lift assembly to the open access door by movement of the second lift assembly in at least one of the horizontal direction and the vertical direction and the second lift assembly is provided with one or more components to be loaded into the cabin of the vehicle, securing the second lift assembly to the landing pad of the rail assembly of the cabin of the vehicle, actuating a carriage assembly relative to a platform of the second lift assembly in a direction that is toward the cabin of the vehicle, and transferring the one or more components to be loaded into the vehicle from the second lift assembly to the cabin of the vehicle.

Embodiments of the second aspect of the present disclosure can include any one or a combination of the following features:
- the step of transferring the one or more components to be loaded into the vehicle from the second lift assembly to the cabin of the vehicle further includes the step of transferring the one or more components to be loaded into the vehicle from storage tracks of the carriage assembly to at least one track of the rail assembly of the cabin of the vehicle;
- the step of actuating a carriage assembly relative to a platform of the second lift assembly in a direction that is toward the cabin of the vehicle further includes the step of guiding the actuation of the carriage assembly relative to the platform with guide rails of the platform;
- the step of transferring the one or more components to be loaded into the vehicle from the second lift assembly to the cabin of the vehicle further includes the step of engaging the components to be loaded into the vehicle with a drive cable of the rail assembly in the cabin of the vehicle;
- the step of securing the second lift assembly to the landing pad of the rail assembly of the cabin of the vehicle further includes the steps of inserting a locking pin into a receptacle on the landing pad of the rail assembly of the cabin of the vehicle, connecting the second lift assembly to a power supply of the vehicle, and connecting the second lift assembly to a data transfer point of the vehicle;

the step of connecting the second lift assembly to a data transfer point of the vehicle includes the step of reading an electronic data tag of the second lift assembly; and the step of reading an electronic data tag of the second lift assembly includes the step of referencing the components to be loaded into the vehicle against an assigned configuration for the vehicle.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 20 is a flow diagram illustrating a method of loading components into the vehicle, according to one example; and FIG. 21 is a flow diagram illustrating a method of exchanging components of the vehicle, according to one example.

DETAILED DESCRIPTION OF THE PREFERRED EMBODIMENTS

Figure 2:
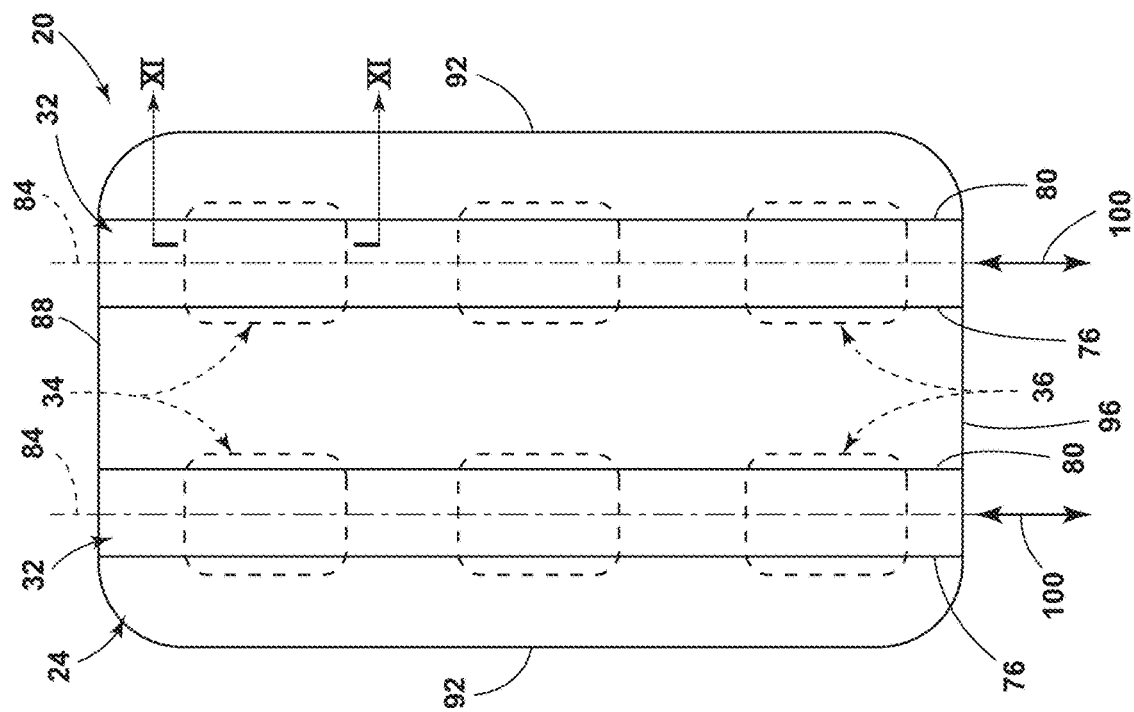
FIG. 2 is a top schematic view of the cabin of the vehicle, illustrating seating assemblies coupled to rail assemblies, according to one example.
Figure 1:
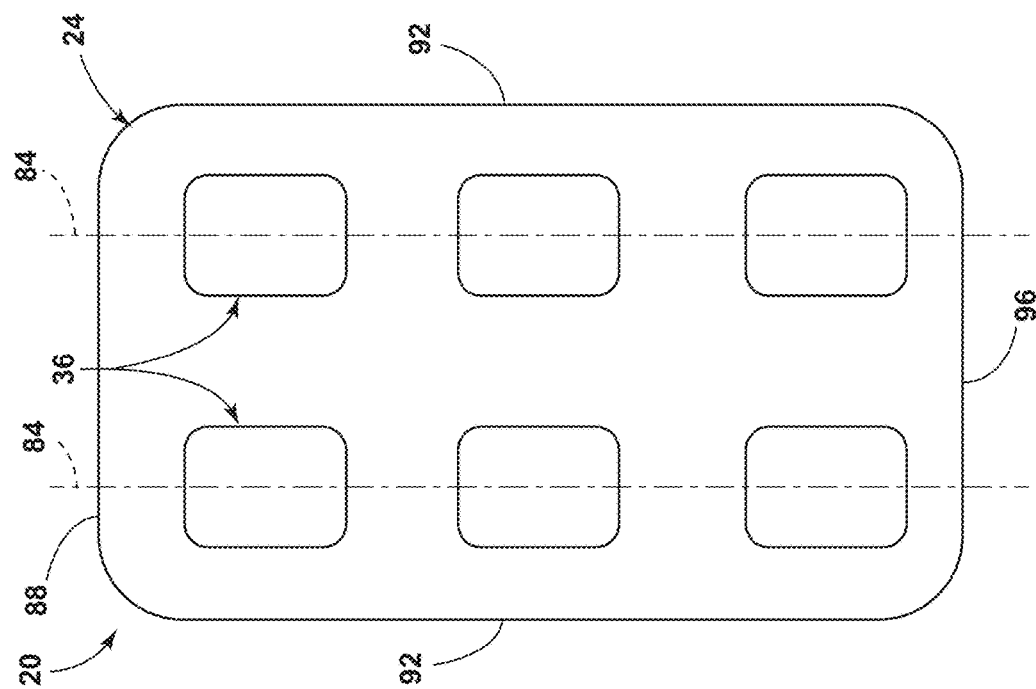
FIG. 1 is a top schematic view of a cabin of a vehicle, illustrating a seating arrangement, according to one example.

For purposes of description herein, the terms "upper," "lower," "right," "left," "rear," "front," "vertical," "horizontal," and derivatives thereof shall relate to the concepts as oriented in FIGS. 1 and/or 17. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a loading a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-19, a vehicle is generally designated by reference numeral 20. The vehicle 20 has a cabin 24 that is equipped with a cabin configuring apparatus 28. The cabin configuring apparatus 28 includes one or more rail assemblies 32 and one or more seating assemblies 36. In various examples, the rail assembly 32 can include a landing pad 38. The rail assembly 32 can include one or more tracks. The rail assembly 32 can define a first channel 40 that receives at least one of data connectors 44 and power connectors 48. In some examples, the data connectors 44 may be omitted in favor of a wireless data communication that can include, but is not limited to, near-field communication (NFC) and/or Bluetooth. The rail assembly 32 can also define a second channel 52 that receives a drive cable 56. The seating assembly 36 can include a drive arm 60 that is selectively engagable with the drive cable 56, locking pins 64 that are selectively engagable with the rail assembly 32, and rollers 68 that engage with a third channel 72 of the rail assembly 32.

Referring again to FIGS. 1 and 2, the cabin 24 of the vehicle 20 can be equipped with one or more of the rail assemblies 32. Each rail assembly 32 can include a first track 76 and a second track 80. The first track 76 and the second track 80 are generally parallel to one another and can extend along one or more axes of the vehicle 20. For example, the depicted example provides the first and second tracks 76, 80 as generally parallel to one another and having a centerline 84 that extends along a longitudinal axis of the vehicle 20. Such tracks and/or rail assemblies 32 may be referred to as longitudinal tracks or longitudinal rail assemblies 32. In various examples, the rail assemblies 32 can extend along longitudinal, lateral, and/or diagonal axes of the vehicle 20. Loading and unloading of the seating assemblies 36 relative to the rail assemblies 32 can be accomplished at a front 88, side 92, and/or rear 96 of the vehicle 20. For example, arrows 100 indicate a load and unload path of the seating assemblies 36 at the rear 96 of the vehicle 20. Loading and unloading of the seating assemblies 36 can enable a variety of uses for the vehicle 20, such as passenger vehicles during normal commute or waking times for users and as cargo vehicles during normal work or resting times for users. When the vehicle 20 is being used as a cargo vehicle, the seating assemblies 36 can be removed or replaced by cargo carriers such as containers, storage compartments, storage units, cabin dividers, and/or cabin partitions. The cargo carriers can be provided with a similar or identical engagement portion that interacts with the rail assembly 32 as the engagement portion disclosed herein with reference to the seating assembly 36.

Figure 3:
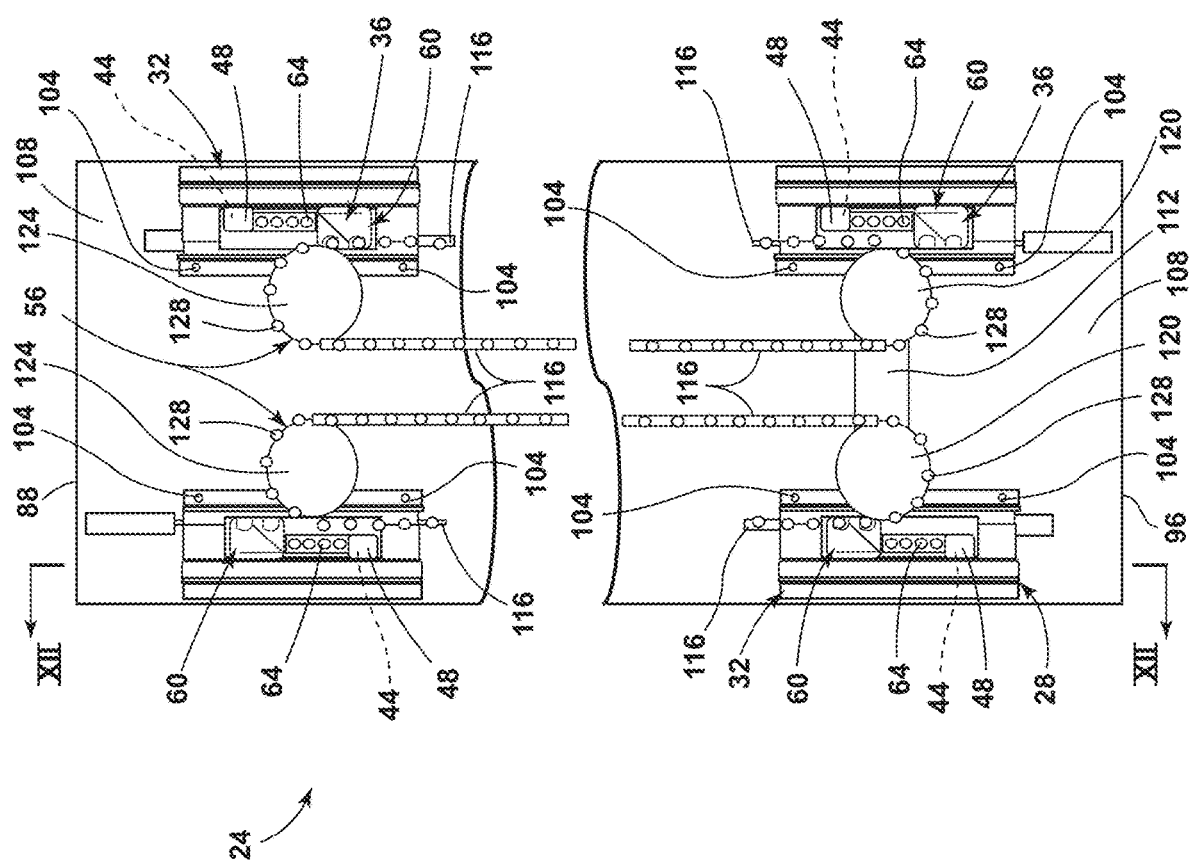
FIG. 3 is a top view of the rail assembly, according to one example, illustrating components of the seating assemblies that engage with the rail assembly and a drive cable.
Figure 4:
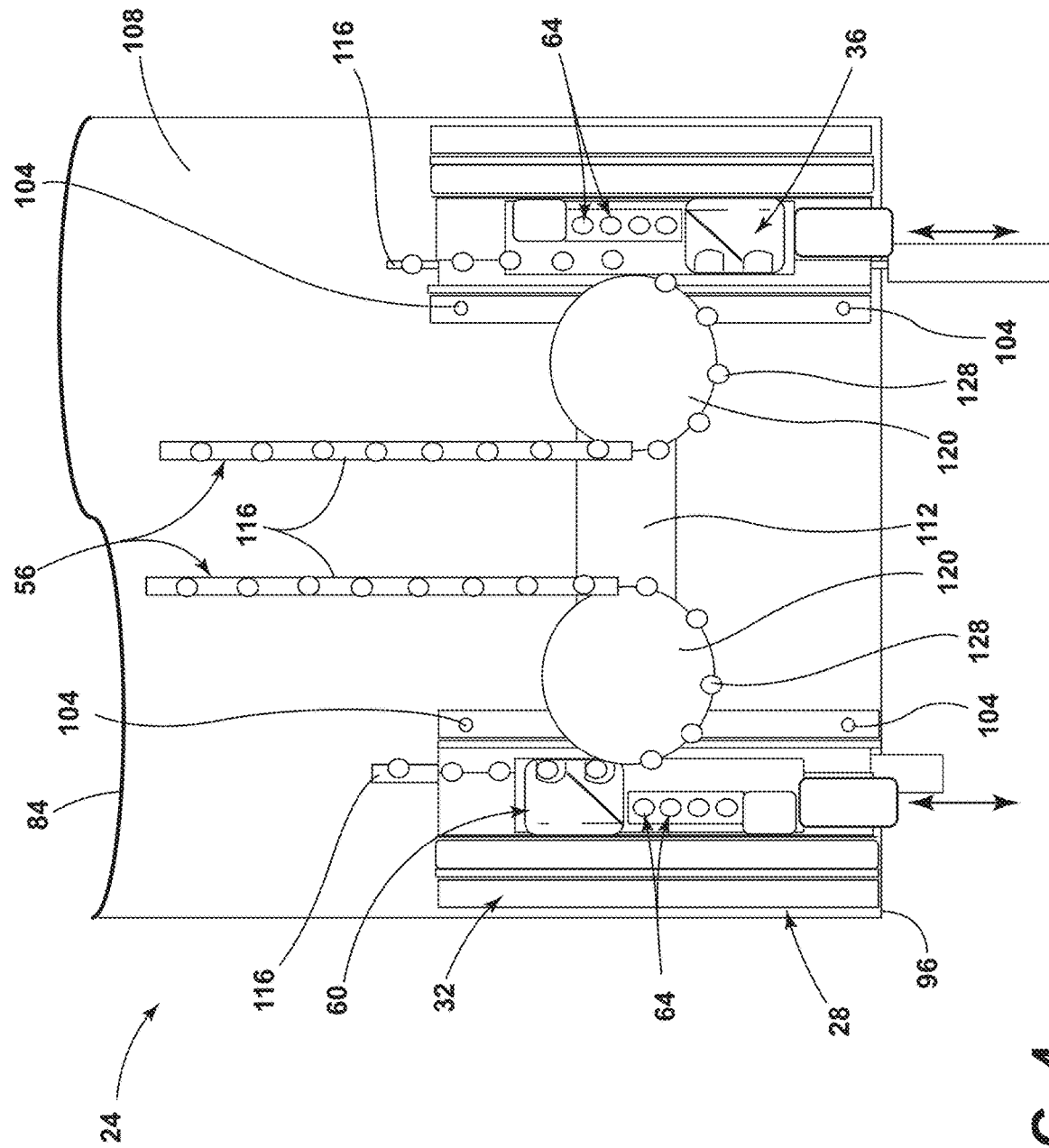
FIG. 4 is a top view of the components of the seating assembly that engage with the rail assembly and a drive mechanism for the drive cable, according to one example.

Referring now to FIGS. 3 and 4, each of the seating assemblies 36 engages with one of the rail assemblies 32 in a slidable and lockable fashion. Each of the rail assemblies 32 is provided with the components that are utilized for actuating the seating assemblies 36 in a horizontal direction, the components utilized for locking the seating assemblies 36 to the rail assemblies 32, the components utilized for establishing and maintaining data connections, and the components utilized for establishing and maintaining power connections. The rail assemblies 32 define floor-mounting apertures 104 that are utilized to fasten the rail assemblies 32 to a floor 108 of the vehicle 20. In operation, the drive cables 56 on the rail assemblies 32 that are coupled to a column of the seating assemblies 36, such as the pair of the rail assemblies 32 depicted in FIGS. 3 and 4, can be counter-rotated by a motor 112 that is positioned at the front 88 or the rear 96 of the vehicle 20. Accordingly, linear sections 116 of the drive cable 56 are synchronized in their motion along the rail assemblies 32 such that a concerted effort is undertaken by the cabin configuring apparatus 28 to translate the seating assembly 36 along the rail assemblies 32. The motor 112 is equipped with one or more rotors 120 that extend therefrom and engage with the drive cable 56 to transmit motion from the motor 112 to the drive cable 56. Each rail assembly 32 may be provided with one or more of the motors 112. In examples where a single motor 112 is utilized for each of the rail assemblies 32, pulleys 124 can be provided at an opposing end of the rail assemblies 32 that permit rotational motion and do not interfere with the operation of the drive cable 56. It may be beneficial to utilize a single motor 112 per pair of rail assemblies 32 as the complexity and timing associated with two or more motors 112 being utilized per rail assembly 32 can increase the weight of the vehicle 20 and create opportunities for binding in the event of the motors 112 becoming out-of-sync. As the drive cable 56 engages with the rotors 120 of the motor 112, the linear sections 116 of the drive cable 56 transition into arcuate sections 128 that follow the curvature of the rotors 120.

Referring again to FIGS. 3 and 4, the portions of the seating assembly 36 that engage with the rail assembly 32 can be offset from one another. For example, the portions of the seating assembly 36 that engage with the rail assembly 32 can be mirror images of one another. The portions of the seating assembly 36 that engage with the rail assembly 32 include at least the data connectors 44, the power connectors 48, the drive arm 60, and the locking pins 64. In the depicted example, the locking pins 64 are positioned between the data and power connectors 44, 48 and the drive arm 60. Accordingly, on a first side of the seating assembly 36 (e.g., the left side) the data and power connectors 44, 48 can be positioned closer to the rear 96 of the vehicle 20 while the drive arm 60 is positioned closer to the front 88 of the vehicle 20. On a second side of the seating assembly 36 (e.g., the right side) the data and power connectors 44, 48 can be positioned closer to the front 88 of the vehicle 20 while the drive arm 60 is positioned closer to the rear 96 of the vehicle 20. It may be beneficial to arrange the portions of the seating assembly 36 that engage with the rail assembly 32 in such a manner so as to enable greater actuation of the seating assembly 36 along the rail assembly 32 while maintaining a coupled arrangement of the data and power connectors 44, 48 with the rail assembly 32. Said another way, as the seating assembly 36 actuates toward the front 88 of the vehicle 20, the drive arm 60 disengages from the drive cable 56 due to the pulleys 124 being positioned vehicle-rearward of a front edge of the rail assembly 32, however, the data and power connectors 44, 48 are positioned vehicle-rearward from the drive arm 60 on the first side of the seating assembly 36 such that the data and power connectors 44, 48 remain coupled to the rail assembly 32 after the drive arm 60 has disengaged from the drive cable 56. On the second side of the seating assembly 36, the drive arm 60 is positioned vehicle-rearward of the data and power connectors 44, 48 such that the drive arm 60 remains engaged with the drive cable 56 after the drive arm 60 on the first side of the seating assembly 36 has disengaged from the drive cable 56. The data and power connectors 44, 48 on the second side of the seating assembly 36 can remain coupled to the rail assembly 32 even after the drive arm 60 on the second side of the seating assembly 36 has disengaged from the drive cable 56. Alternatively, the data and power connectors 44, 48 on the second side of the seating assembly 36 can disengage with the rail assembly 32 before, or simultaneous with, the disengagement of the drive arm 60 from the drive cable 56.

Referring further to FIGS. 3 and 4, the mirrored or offset relationship of the first and second sides of the seating assembly 36 with respect to the configuration of the portions of the seating assembly 36 that engage with the rail assembly 32 enables a greater degree of driven actuation along the rail assembly 32 as well as a greater horizontal distance of connection of the data and power connectors 44, 48 along the rail assembly 32. The mirrored or offset relationship enables the greater actuation and the greater horizontal length of connection at both ends (e.g., front and rear) of the rail assembly 32. Specifically, as the seating assembly 36 is actuated to the front 88 of the vehicle 20, the drive arm 60 on the left side of the seating assembly 36, as depicted, disengages from the drive cable 56 as the drive arm 60 draws even with and passes the pulley 124 and the drive arm 60 on the right side of the seating assembly 36, as depicted, remains engaged with the drive cable 56 such that the seating assembly 36 can continue horizontal motion along the rail assembly 32 toward the front 88 of the vehicle 20. After the drive arm 60 has disengaged with the drive cable 56 on the left side of the seating assembly 36, the data and power connectors 44, 48 on the left side of the seating assembly 36 remain coupled to data and power connectors 44, 48 that are provided on the rail assembly 32. Additionally, the data and power connectors 44, 48 on the left side of the seating assembly 36 remain coupled to the data and power connectors 44, 48 on the rail assembly 32 after the drive arm 60 on the right side of the seating assembly 36 disengages from the drive cable 56. Accordingly, power is provided to the seating assembly 36 independent of whether or not the seating assembly 36 is in a location that is capable of engaging with the drive cable 56 such that a user can adjust settings of the seating assembly 36 that include, but are not limited to, backrest tilt angle, heating of the seating assembly 36, cooling or ventilation of the seating assembly 36, and various other comfort settings. Additionally, a data connection can be maintained between the vehicle 20 and the seating assembly 36 independent of whether or not the seating assembly 36 is in a location that is capable of engaging with the drive cable 56 such that various data can be obtained about the seating assembly 36 that includes, but is not limited to, a position of the seating assembly 36 within the vehicle 20, an occupied or unoccupied status of the seating assembly 36, and various other data that can be provided by the seating assembly 36.

Referring still further to FIGS. 3 and 4, as the seating assembly 36 is actuated to the rear 96 of the vehicle 20, the drive arm 60 on the right side of the seating assembly 36, as depicted, disengages from the drive cable 56 as the drive arm 60 draws even with and passes the rotor 120 and the drive arm 60 on the left side of the seating assembly 36, as depicted, remains engaged with the drive cable 56 such that the seating assembly 36 can continue horizontal motion along the rail assembly 32 toward the rear 96 of the vehicle 20. After the drive arm 60 has disengaged with the drive cable 56 on the right side of the seating assembly 36, the data and power connectors 44, 48 on the right side of the seating assembly 36 remain coupled to the data and power connectors 44, 48 that are provided on the rail assembly 32. Additionally, the data and power connectors 44, 48 on the right side of the seating assembly 36 remain coupled to the data and power connectors 44, 48 on the rail assembly 32 after the drive arm 60 on the left side of the seating assembly 36 disengages from the drive cable 56. Accordingly, power is provided to the seating assembly 36 independent of whether or not the seating assembly 36 is in a location that is capable of engaging with the drive cable 56 such that a user can adjust settings of the seating assembly 36 that include, but are not limited to, backrest tilt angle, heating of the seating assembly 36, cooling or ventilation of the seating assembly 36, and various other comfort settings. Additionally, a data connection can be maintained between the vehicle 20 and the seating assembly 36 independent of whether or not the seating assembly 36 is in a location that is capable of engaging with the drive cable 56 such that various data can be obtained about the seating assembly 36 that includes, but is not limited to, a position of the seating assembly 36 within the vehicle 20, an occupied or unoccupied status of the seating assembly 36, and various other data that can be provided by the seating assembly 36.

Figure 5:
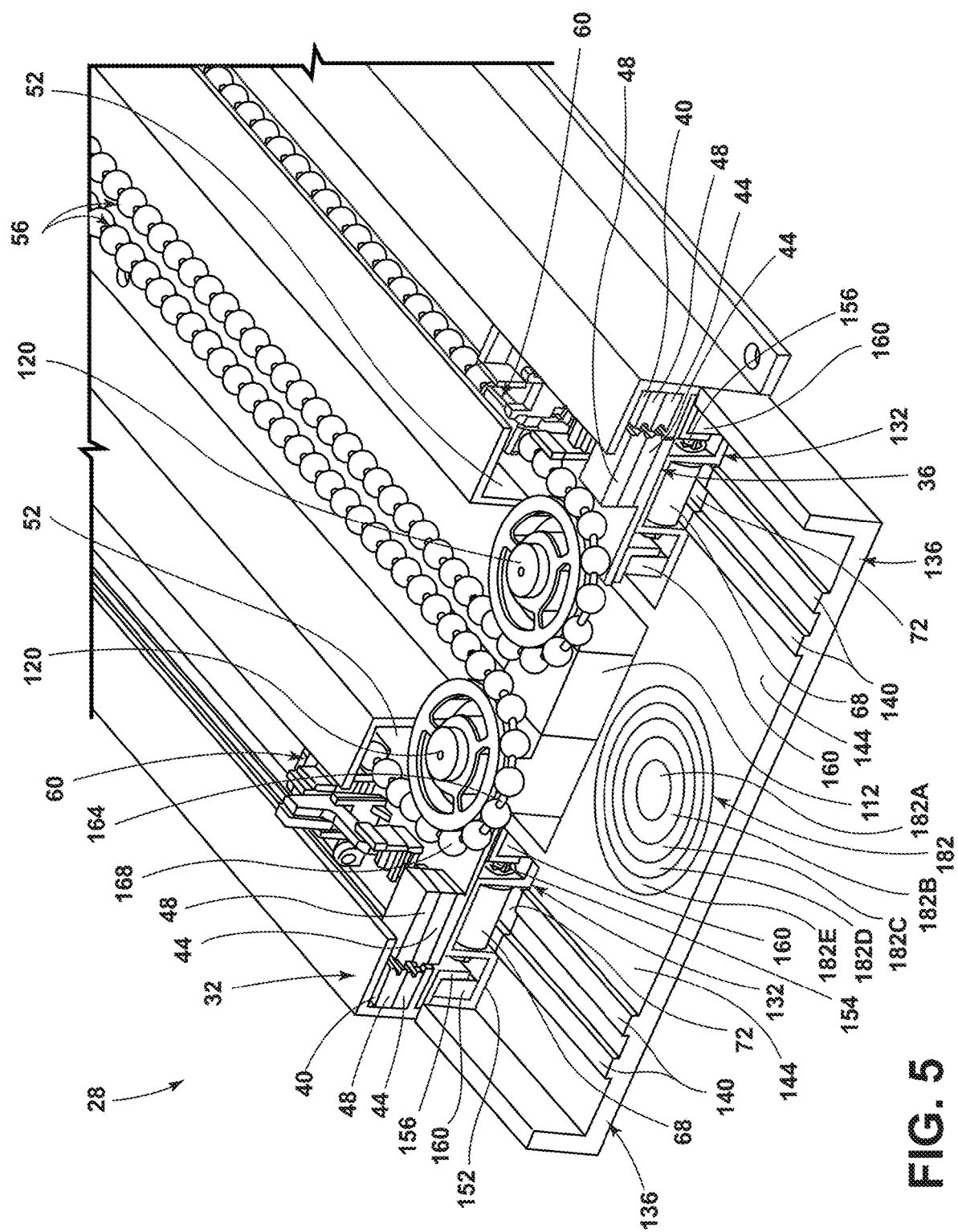
FIG. 5 is a side perspective view of the rail assembly, according to one example, illustrating the various components of the rail assembly.
Figure 6:
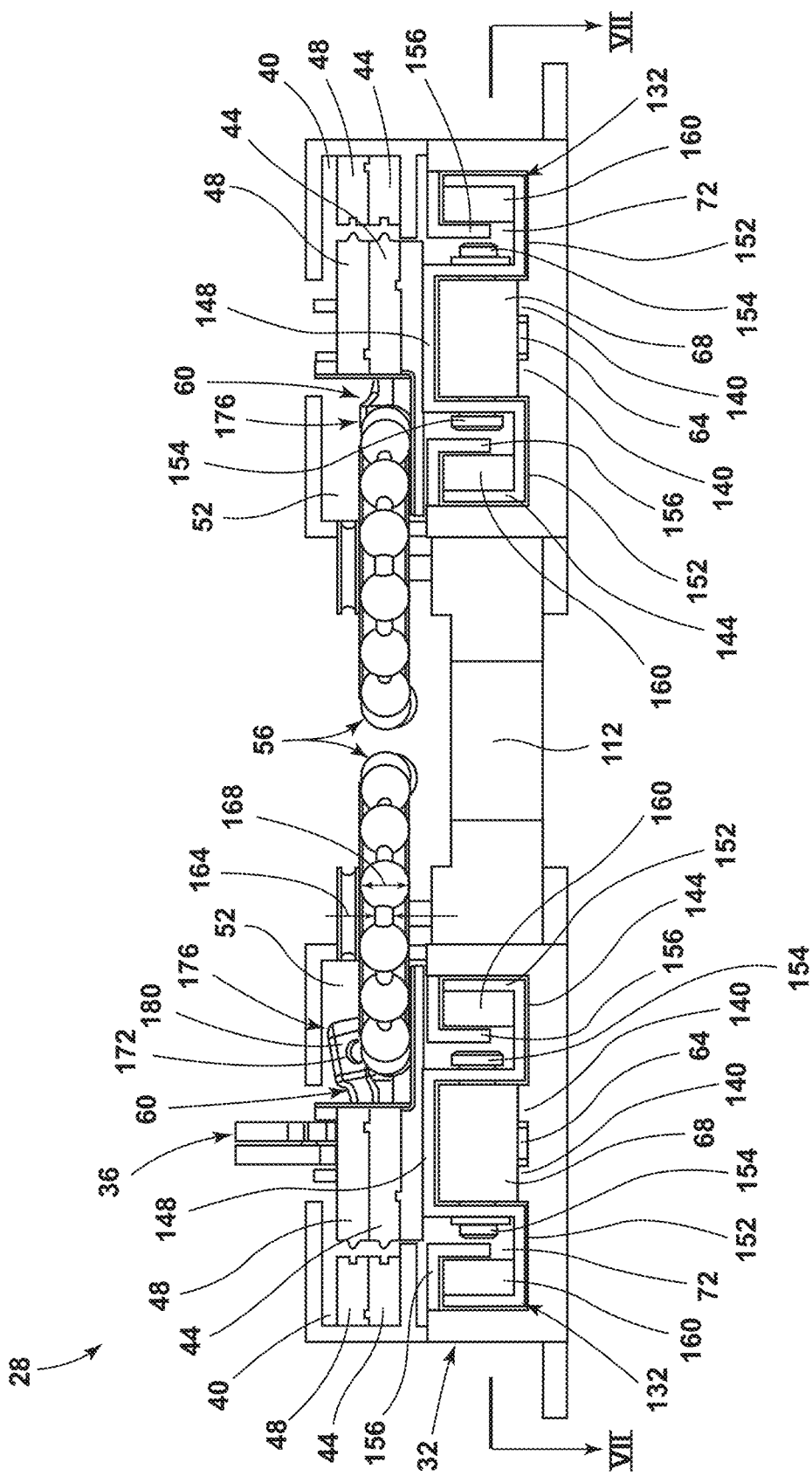
FIG. 6 is a front view of the rail assembly, according to one example, illustrating the various components of the rail assembly.
Figure 7:
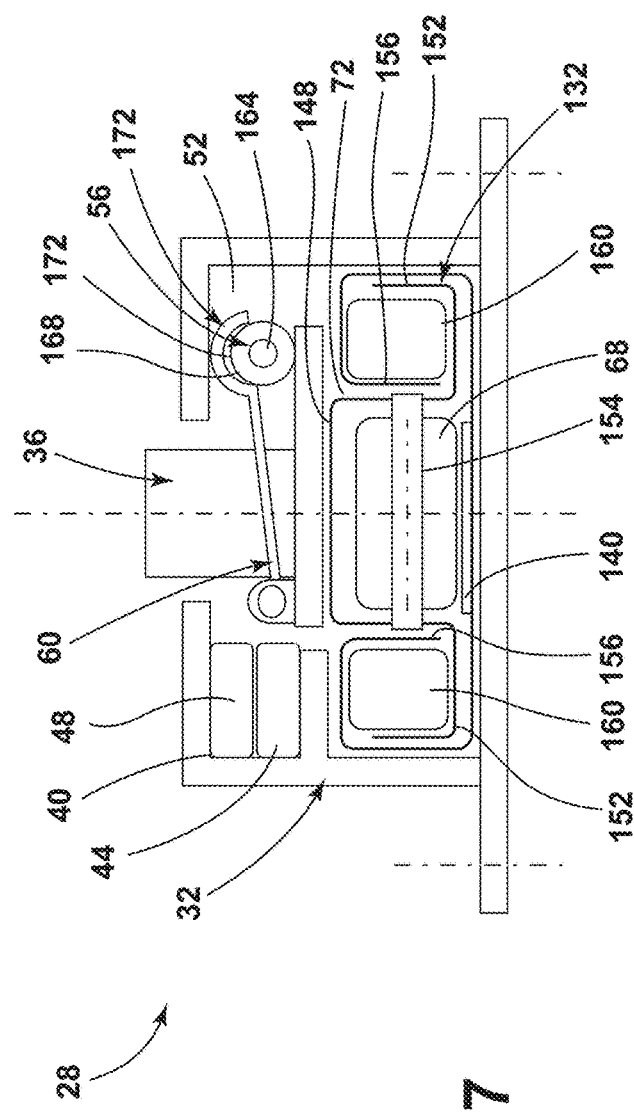
FIG. 7 is a cross-sectional view of the rail assembly, taken along line VII-VII of FIG. 6, according to one example and illustrating a drive arm engaging with the drive cable.

Referring to FIGS. 5-7, when the seating assembly 36 is loaded onto the vehicle 20, the rail assembly 32 receives a track bracket 132 of the seating assembly 36. The track bracket 132 can first engage with a rail end 136 of the rail assembly 32. The rail end 136 can be generally U-shaped with an open top such that initial coupling of the seating assembly 36 to the rail assembly 32 is not impeded by a ceiling or upper surface of the rail assembly 32. The rail assembly 32 may be equipped with one or more plateaus 140 that extend vertically upward from a surface of the rail assembly 32 and extend along a length of the rail assembly 32 (e.g., a partial length, a substantial length, or an entire length of the rail assembly 32). In examples where a plurality of plateaus 140 are employed, such as that depicted, the plateaus 140 can be laterally spaced apart. Regardless of the number of plateaus 140 that are employed, the plateaus 140 may serve a variety of purposes. In one instance, the plateaus 140 can provide lateral retention forces to at least a portion of the track bracket 132. In another instance, the plateaus 140 can be utilized as an alignment aid when the seating assembly 36 is being coupled to the rail assembly 32. In yet another instance, the plateaus 140 can provide an engagement surface for the rollers 68 that enables the track bracket 132 to be suspended above a bottom engagement surface 144 of the third channel 72 such that friction is reduced between the seating assembly 36 and the rail assembly 32. By suspending the track bracket 132 above the bottom engagement surface 144 of the third channel 72, sliding friction is avoided and rolling friction is employed. Rolling friction tends to be much less than sliding friction. Accordingly, the seating assembly 36 is made easier to maneuver along the rail assembly 32 whether by manual actuation by a user or by powered actuation by the motor 112.

Referring again to FIGS. 5-7, the track bracket 132 engages with the rail assembly 32. The engagement between the track bracket 132 and the rail assembly 32 provides horizontal and vertical retention forces to the seating assembly 36 such that the seating assembly 36 remains coupled to the rail assembly 32. In the depicted example, the track bracket 132 is generally sinusoidal in shape. The generally sinusoidal shape of the track bracket 132 defines a central raised portion 148 that is flanked on either side by upturned portions 152. The central raised portion 148 can receive at least one of the rollers 68. For example, the rollers 68 of the seating assembly 36 can be positioned within an underside of the central raised portion 148 of the track bracket 132. Accordingly, the rollers 68 can be retained to the track bracket 132 and rotationally supported by an axle 154 that extends through the roller 68 and engages with the central raised portion 148 of the track bracket 132. The third channel 72 of the rail assembly 32 includes downturned portions 156 that engage with the upturned portions 152 of the track bracket 132. The downturned portions 156 and the upturned portions 152 can engage such that the seating assembly 36 is vertically and horizontally retained to the rail assembly 32. In various examples, one or more glide bars 160 can be positioned between the rail assembly 32 and the seating assembly 36. The glide bars 160 can decrease a coefficient of friction between the seating assembly 36 and the rail assembly 32. In one specific example, the glide bars 160 can be coupled to the seating assembly 36 such that the glide bars 160 traverse the rail assembly 32 with the seating assembly 36. Said another way, the glide bars 160 may be constantly co-localized with the seating assembly 36 throughout actuation of the seating assembly 36 along the rail assembly 32. For example, the glide bars 160 can be directly coupled to a surface of the upturned portions 152 of the track bracket 132. In alternative examples, the glide bars 160 can extend along the length of the rail assembly 32 with the glide bars 160 configured to be positioned between the track bracket 132 and at least a portion of the rail assembly 32. For example, the glide bars 160 can be coupled to the downturned portions 156 such that the glide bars 160 are positioned between the downturned portions 156 and the upturned portions 152. In such examples, the glide bars 160 may extend along a substantial portion of the length of the rail assembly 32.

Referring further to FIGS. 5-7, the drive cable 56 can be provided with a first thickness 164 and a second thickness 168. The first and second thicknesses 164, 168 can be alternately positioned along the length of the drive cable 56. Said another way, each section of the first thickness 164 can be flanked on either side by one of the sections of the second thickness 168 and each section of the second thickness 168 can be flanked on either side by one of the sections of the first thickness 164. The drive arm 60 engages with at least one section of the first thickness 164 of the drive cable 56 and at least one section of the second thickness 168 of the drive cable 56. The second thickness 168 of the drive cable 56 can be greater than the first thickness 164 of the drive cable 56. In various examples, the second thickness 168 of the drive cable 56 can be a load-bearing section of the drive cable 56. To facilitate engagement between the drive arm 60 and the drive cable 56, the drive arm 60 can be provided with one or more recesses 172 that are positioned in, and defined by, a head 176 of the drive arm 60. The recesses 172 are configured to receive one of the sections of the drive cable 56 that has the second thickness 168 in a manner that engages either side of the second thickness 168 section, or traps the second thickness 168, within the head 176 of the drive arm 60. When the drive cable 56 is actuated and the drive arm 60 is engaged with the drive cable 56, the section of the second thickness 168 contacts a wall 180 of the head 176 of the drive aim 60. The wall 180 transmits horizontal motion of the drive cable 56 into horizontal motion of the drive arm 60 and ultimately the seating assembly 36. It may be beneficial to provide the drive arm 60 with a plurality of the recesses 172 (e.g., two, three, four, etc.) to improve load distribution during the load-bearing events when the drive arm 60 is engaged with the drive cable 56. Additionally, providing a plurality of the recesses 172 can improve the chances of the recesses 172 capturing the second thickness 168 of the drive cable 56. In examples where a plurality of the recesses 172 are employed, the plurality of recesses 172 can be interconnected by tunnels or bridges that can correspond with the sections of the first thickness 164 of the drive cable 56 that interconnect the sections of the second thicknesses 168 of the drive cable 56 that are engaged by the recesses 172.

Referring still further to FIGS. 5-7, the landing pad 38 can be positioned between the plateaus 140 of the rail assembly 32 that are associated with the rollers 68 and the third channels 72 of the rail assembly 32. The landing pad 38 may be positioned proximate the motor 112 at the rail end 136 where components may be loaded and/or unloaded to/from the rail assembly 32. In various examples, the landing pad 38 can include a coupling assembly 182. The coupling assembly 182 can include a locking portion or locator portion 182A, a receiving portion 182B, a data carrying portion 182C, a negative voltage carrier 182D, and/or a positive voltage carrier 182E. The coupling assembly 182 will be discussed in further detail below.

Figure 8:
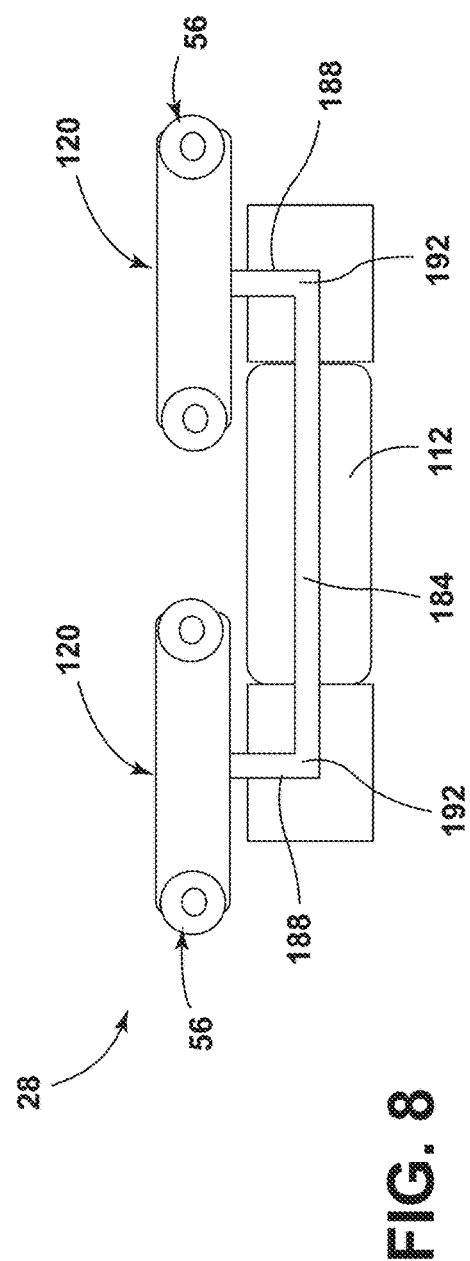
FIG. 8 is a cross-sectional view of the drive mechanism, taken along line of FIG. 6, according to one example and illustrating an interaction between a motor, rotors, and the drive cable.

Referring now to FIG. 8, a relationship between the motor 112 and the rotors 120 is shown. The motor 112 is provided with one or more driveshafts 184 that extend in a lateral direction to transmit motion to the rotors 120. The rotors 120 are provided with axle rods 188 that extend from the rotors 120 toward the driveshaft 184 of the motor 112. The driveshaft 184 and the axle rods 188 can engage with a gear assembly that is positioned at a junction 192 between the driveshaft 184 and the axle rods 188. The gear assembly can be configured as a right-angle gear assembly where the rotational motion about a horizontal axis of the driveshaft 184 is transmitted into rotational motion about a vertical axis of the axle rods 188. Accordingly, rotational motion that is driven by the motor 112 can be transmitted to rotational motion of the rotors 120 and ultimately into lateral motion of the drive cable 56.

Figure 9:
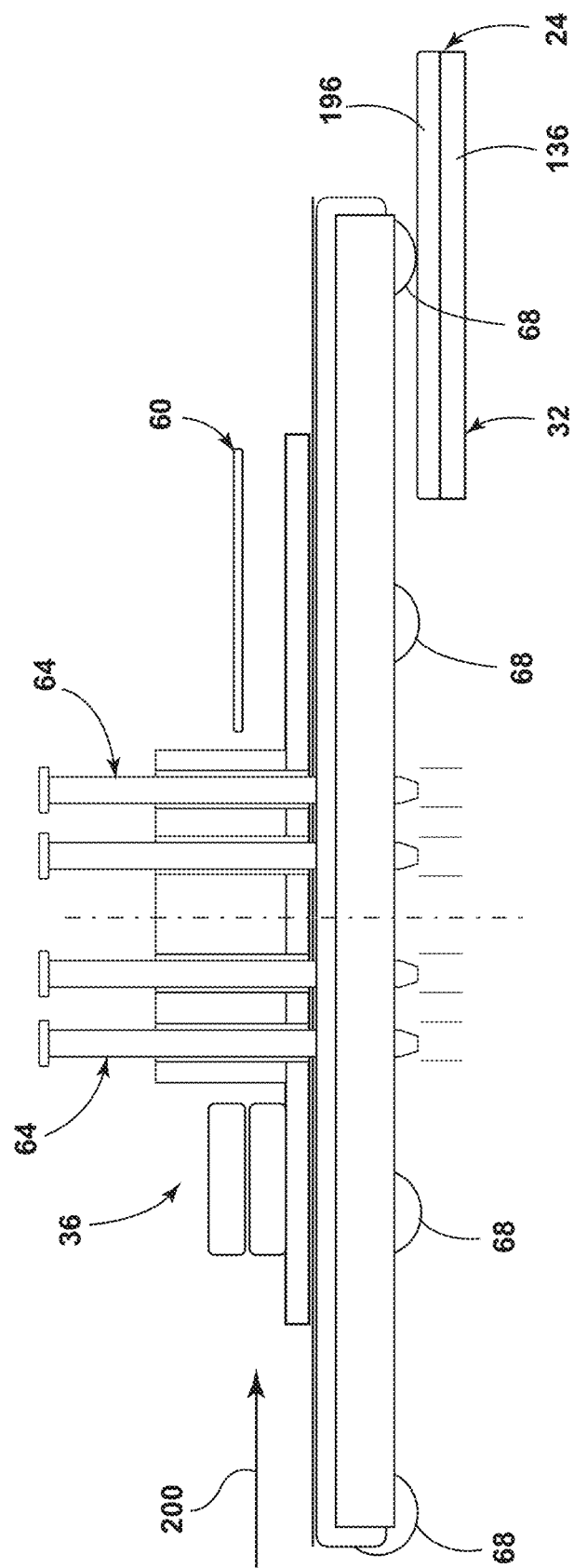
FIG. 9 is a side view of the seating assembly, illustrating a loading of the seating assembly into the cabin of the vehicle, according to one example.
Figure 10:
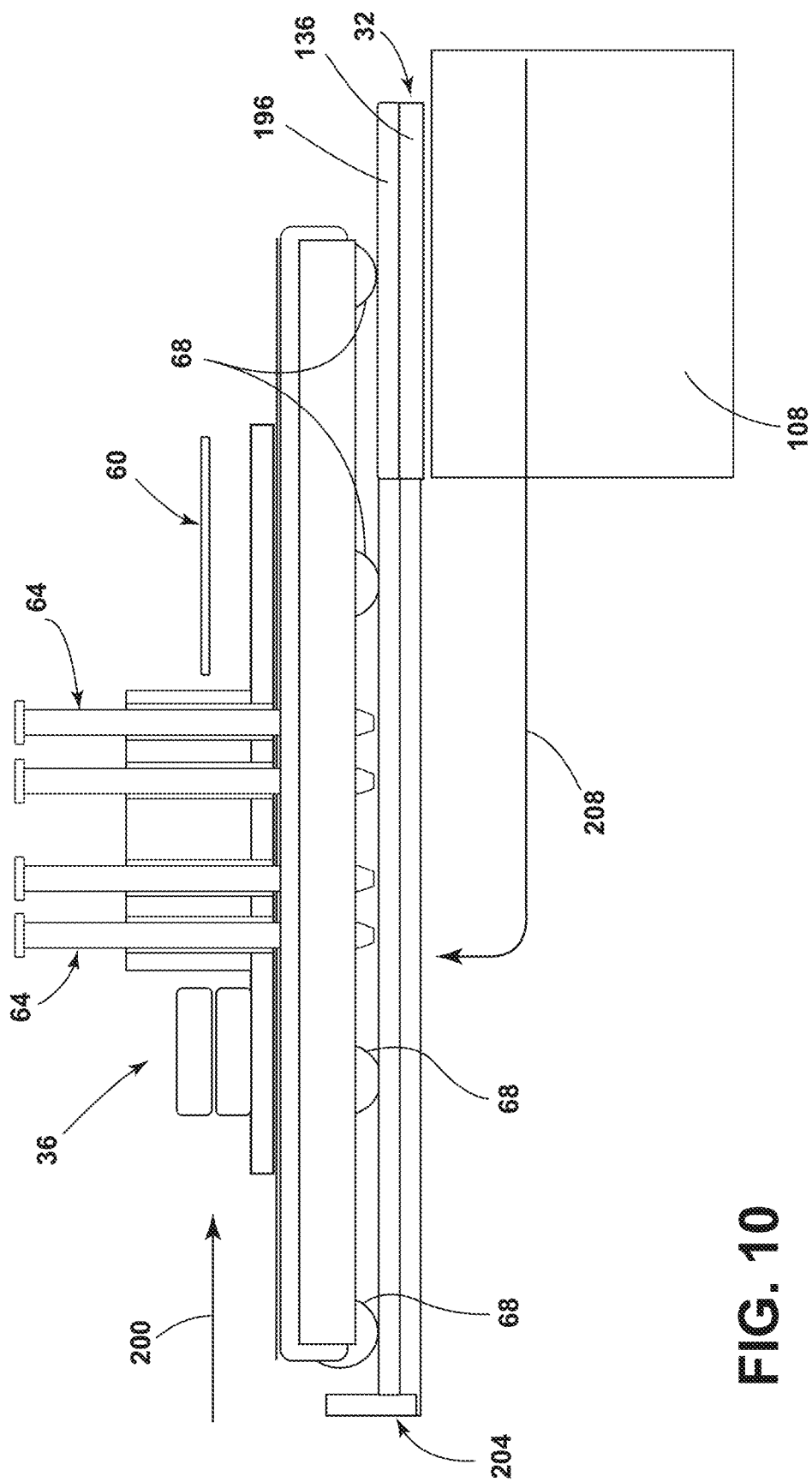
FIG. 10 is a side view of the seating assembly, illustrating the loading of the seating assembly into the cabin of the vehicle, according to another example.

Referring to FIGS. 9 and 10, the seating assembly 36 is shown being loaded into the cabin 24 of the vehicle 20 and onto the rail assembly 32. For example, the seating assembly 36 is being loaded onto the rail assembly 32 at the rail end 136. The rail assembly 32 can be provided with a wear strip 196 that the rollers 68 ride along. The wear strip 196 can be made of a material that engages with the rollers 68 in a low friction manner. The wear strip 196 can be provided as an easily replaceable component positioned on the rail assembly 32. For example, the wear strip 196 can be positioned on top of the one or more plateaus 140. A loading direction is indicated at arrow 200 and designates the direction that the seating assembly 36 is actuated along to transition from the seating assembly 36 being disengaged from the rail assembly 32 to the seating assembly 36 being engaged with the rail assembly 32. In some examples, the vehicle 20 can be provided with a loading table 204 that is actuatable from below the rail assembly 32. The loading table 204 can be stored in the floor 108 of the vehicle 20 and actuated to an extended position, as shown in FIG. 10, when the seating assembly 36 is being loaded onto the vehicle 20 or unloaded from the vehicle 20. The loading table 204 decreases an amount of physical exertion by a user in the loading and unloading process for the seating assembly 36. Deployment of the loading table 204 from a stowed position can be accomplished by at least two of horizontal, vertical, and rotational motion. In one example, the loading table 204 is deployed by sequential horizontal and vertical motion of the loading table 204, as indicated by arrow 208. In some examples, the loading table 204 can be provided as a component to a lift mechanism. The lift mechanism can be lowered to a height that is at or near ground level to allow the user to either roll or lift the seating assembly 36 onto the loading table 204 with a minimal amount of effort. Once the seating assembly 36 has been loaded onto the loading table 204, the lift mechanism can raise the loading table 204 to the position shown in FIG. 10 and the seating assembly 36 can be engaged with the rail assembly 32. In some examples, the loading and unloading of the seating assemblies 36 can be accomplished in an automated fashion with little to no input from a user.

Figure 11:
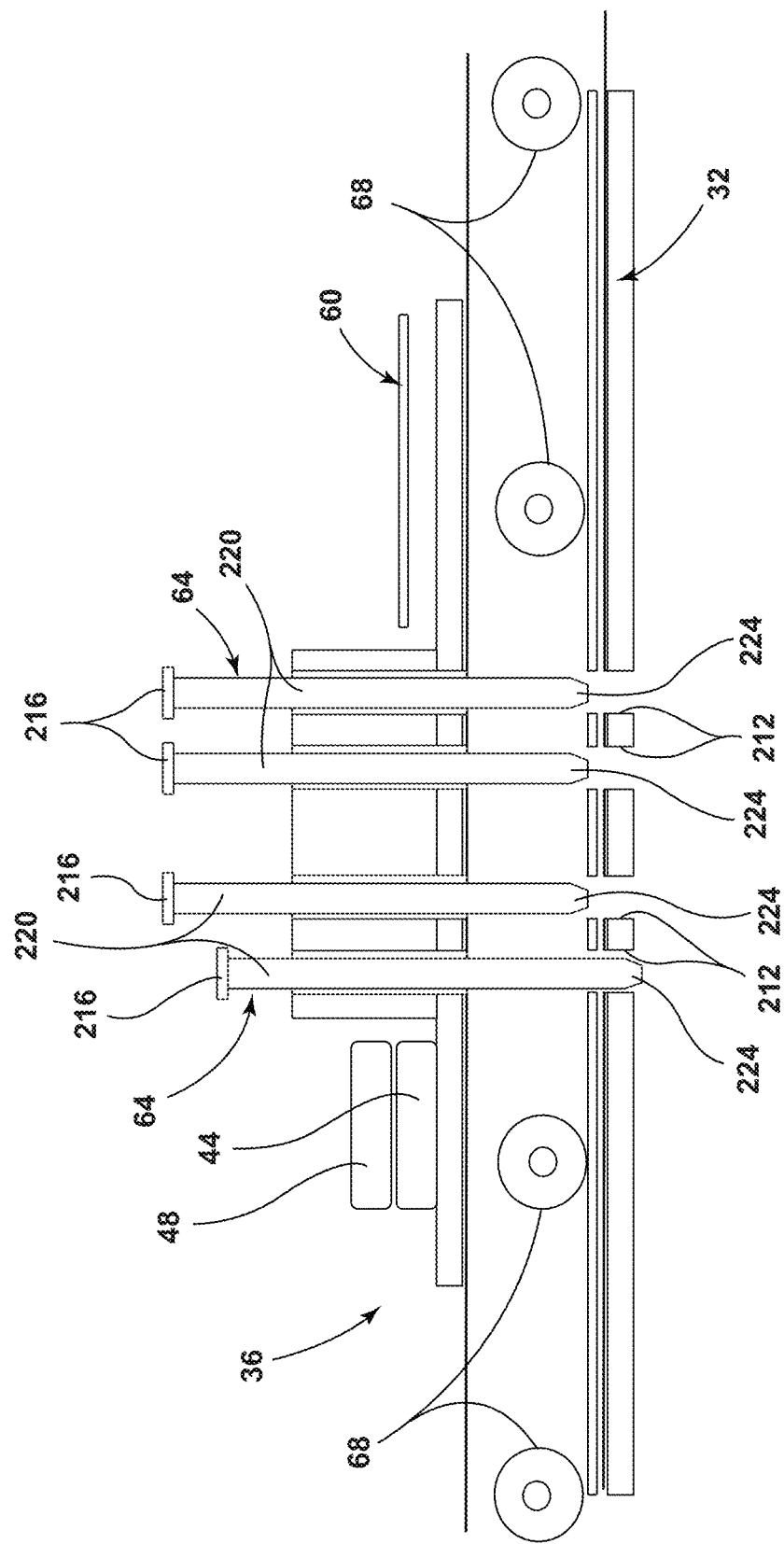
FIG. 11 is a cross-sectional view of the seating assembly, taken along line XI-XI of FIG. 2, illustrating an engagement between locking pins of the seating assembly and pin apertures in the rail assembly, according to one example.

Referring now to FIG. 11, the rail assembly 32 defines a plurality of pin apertures 212 that receive the locking pins 64. The pin apertures 212 can extend along the length of the rail assembly 32 such that the seating assembly 36 can be locked into a position along the rail assembly 32. In various examples, the pin apertures 212 can extend along a substantial portion of the length of the rail assembly 32 or the entire length of the rail assembly 32. The locking pins 64 are configured to have at least one of the locking pins 64 engage with the pin apertures 212 when the locking pins 64 are in a locked configuration. In the depicted example, four of the locking pins 64 are provided. However, it is contemplated that fewer or greater locking pins 64 can be employed without departing from the concepts disclosed herein. For example, three locking pins 64 may be employed or five locking pins 64 may be employed. By providing four locking pins 64 and having only one of the locking pins 64 engages with the pin apertures 212 at a time, a user may be presented with a seemingly infinite or continuous number of locking positions of the seating assembly 36 relative to the rail assembly 32. The seemingly infinite or continuous number of locking positions results from one of the locking pins 64 being capable of engaging with one of the pin apertures 212 at a given position such that the incremental changes of the position of the seating assembly 36 relative to the rail assembly 32 is limited by the proximity or spacing of the locking pins 64 relative to one another. The locking pins 64 are provided with a cross-member 216 that is position in perpendicular relationship to a pin shaft 220. The pin shafts 220 include a tapered end 224 that is opposite the cross-member 216. The tapered end 224 allows the locking pins 64 to engage with the pin apertures 212 even when the locking pins 64 and the pin apertures 212 are slightly offset from one another in the horizontal direction. The cross-members 216 prevent the locking pins 64 from being permitted to actuate too far into the pin apertures 212 while also providing a surface that can be engaged by a release mechanism to raise the locking pin(s) 64 out of the pin aperture(s) 212. For example, the release mechanism can engage with an underside surface of the cross-member 216 such that actuation of the release mechanism induces vertical motion of the locking pin 64 until the locking pin 64 is no longer engaged with the pin aperture 212.

Figure 12:
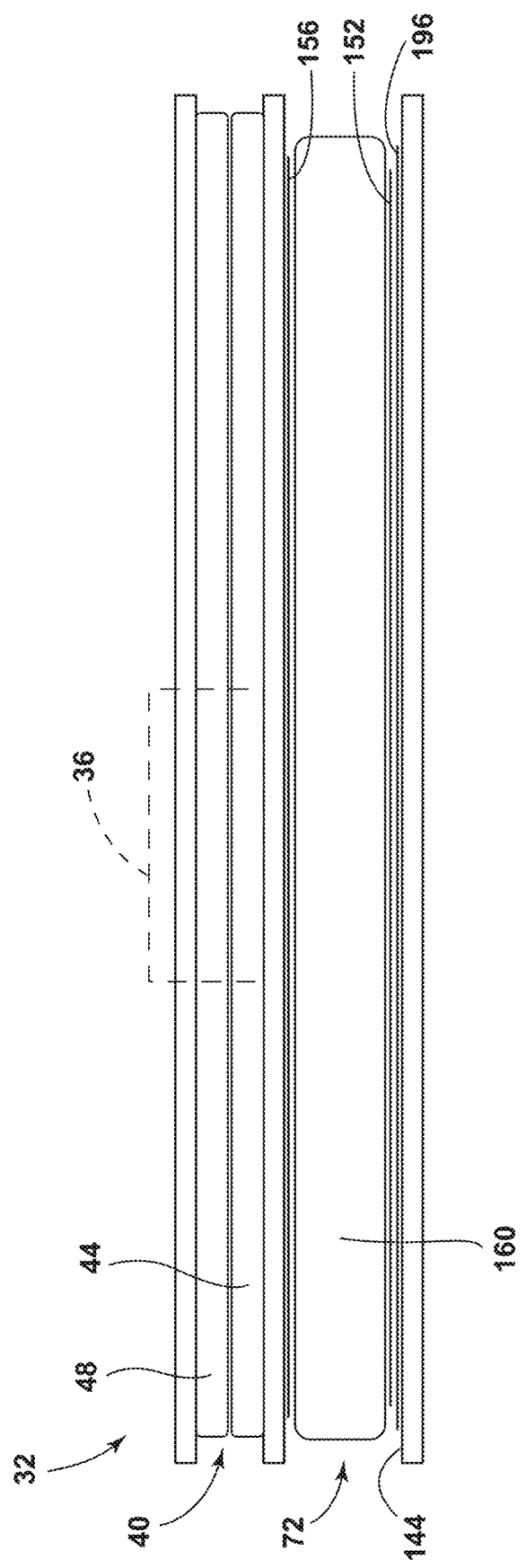
FIG. 12 is a cross-sectional view of the rail assembly and the seating assembly coupled to one another, taken along line XII-XII of FIG. 3, illustrating interactions between various components of the seating assembly and the rail assembly, according to one example.
Figure 13:
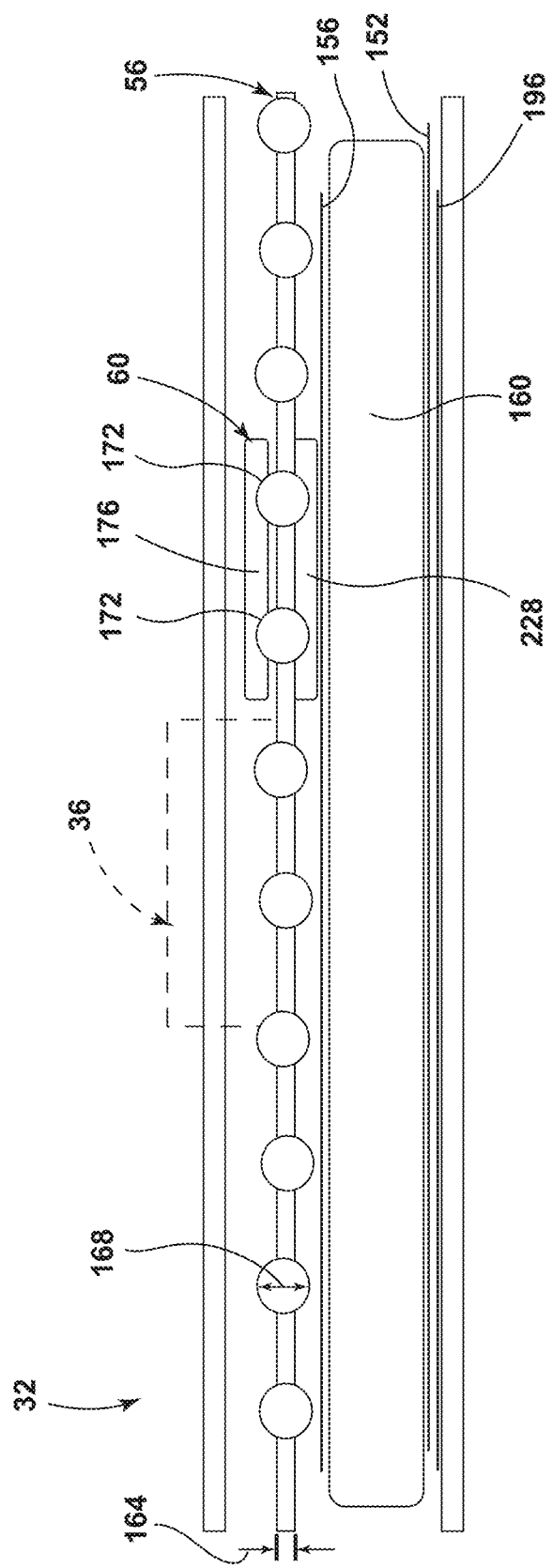
FIG. 13 is a cross-sectional view of the rail assembly and the seating assembly coupled to one another, taken along line XII-XII of FIG. 3, according to one example and illustrating an engagement between the drive arm and the drive cable.

Referring to FIGS. 12 and 13, the rail assembly 32 is shown in a cross-sectional view taken along line XII-XII of FIG. 3, according to one example. The seating assembly 36 is coupled to the rail assembly 32 and is represented by phantom lines. In the depicted example, the glide bars 160 extend along a substantial portion or an entirety of the length of the rail assembly 32, The glide bars 160 are positioned between the upturned portions 152 of the track bracket 132 and the downturned portions 156 of the rail assembly 32. In the depicted example, the glide bars 160 can be directly coupled to the downturned portions 156 of the rail assembly 32. The wear strip 196 can be positioned between the upturned portions 152 and the bottom engagement surface 144 of the third channel 72. The data and power connectors 44, 48 are positioned within the first channel 40. The data and power connectors 44, 48 extend along a substantial portion or an entirety of the length of the rail assembly 32. The first and second thicknesses 164, 168 of the drive cable 56 alternate along the length of the drive cable 56. In the depicted example of FIG. 13, the drive arm 60 is configured to engage with a plurality of the sections of the first and second thicknesses 164, 168. The drive cable 56 can be sandwiched or clamped between the head 176 of the drive arm 60 and an arm plate 228 of the drive arm 60. The arm plate 228 is positioned below the head 176 of the drive arm 60 and may contain complementary structures to the recesses 172 in the head 176. The complimentary structures to the recesses 172 are positioned on the opposite side of the drive cable 56 from the recesses 172 and are configured to engage with the drive cable 56 in a similar manner. In some examples, the arm plate 228 is a substantially planar structure that is not equipped with the complimentary structures to the recesses 172 in the head 176 of the drive arm 60. Accordingly, the drive cable 56 can be sandwiched between the head 176 and the arm plate 228 with the recesses 172 in the head 176 providing physical retention of the drive cable 56 by physical interference between the drive cable 56 and the drive arm 60. The arm plate 228 can provide frictional retention of the drive cable 56 in such an example.

Figure 14:
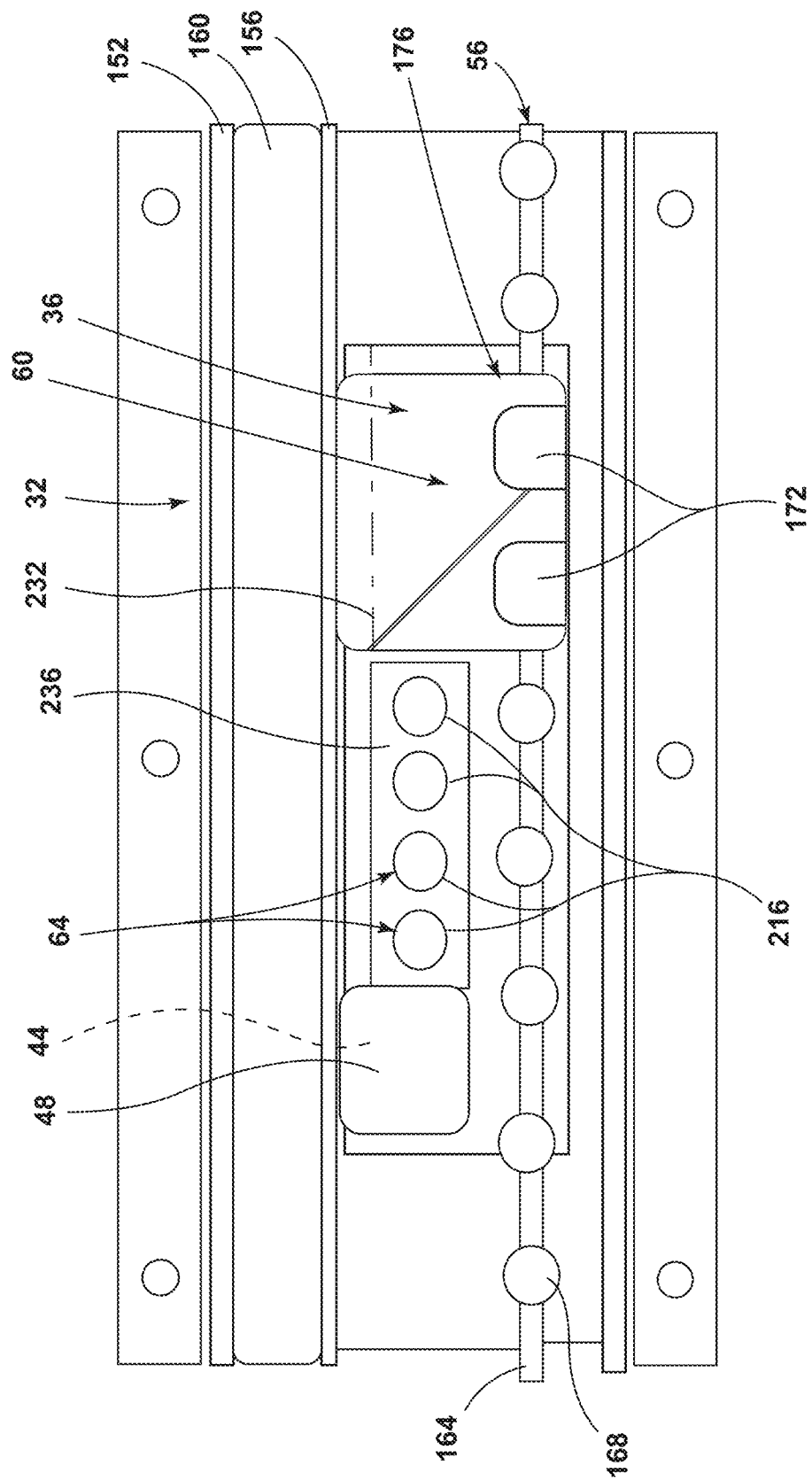
FIG. 14 is a top view of some of the components of the seating assembly that engage with the rail assembly, according to one example and illustrating the engagement between the drive arm and the drive cable.

Referring now to FIG. 14, the drive arm 60 is shown with two of the recesses 172 in the head 176 of the drive arm 60. The recesses 172 are in an engaged position with the drive cable 56 such that lateral motion of the seating assembly 36 may be induced. As described above, the recesses 172 can engage with the first and/or second thicknesses 164, 168 of the drive cable 56. To move between the engaged position and a disengaged position, the head 176 of the drive arm 60 can be rotated or pivoted about a pivot axis 232. The pivot axis 232 can extend in the same direction as the rail assembly 32 and be positioned on an opposite side of the drive arm 60 from the recesses 172. The glide bar 160 can be seen positioned between the upturned portion 152 of the track bracket 132 and the downturned portion 156 of the rail assembly 32. The cross-members 216 of the locking pins 64 can extend above a housing 236 that receives the locking pins 64. When the locking pins 64 are actuated between raised and lowered positions, the locking pins 64 move in a vertical direction within the housing 236. When the seating assembly 36 has reached a desired position, the drive arm 60 disengages from the drive cable 56 and the locking pins 64 engage with the rail assembly 32. Accordingly, the locking pins 64 carry impact loads in the event of a vehicle-to-vehicle impact, a vehicle-to-object impact, and/or cargo-to-seating-assembly impacts. The drive cable 56 is not utilized to carry impact loads in the event of the vehicle-to-vehicle impact, the vehicle-to-object impact, and/or the cargo-to-seating-assembly impacts.

Figure 15:
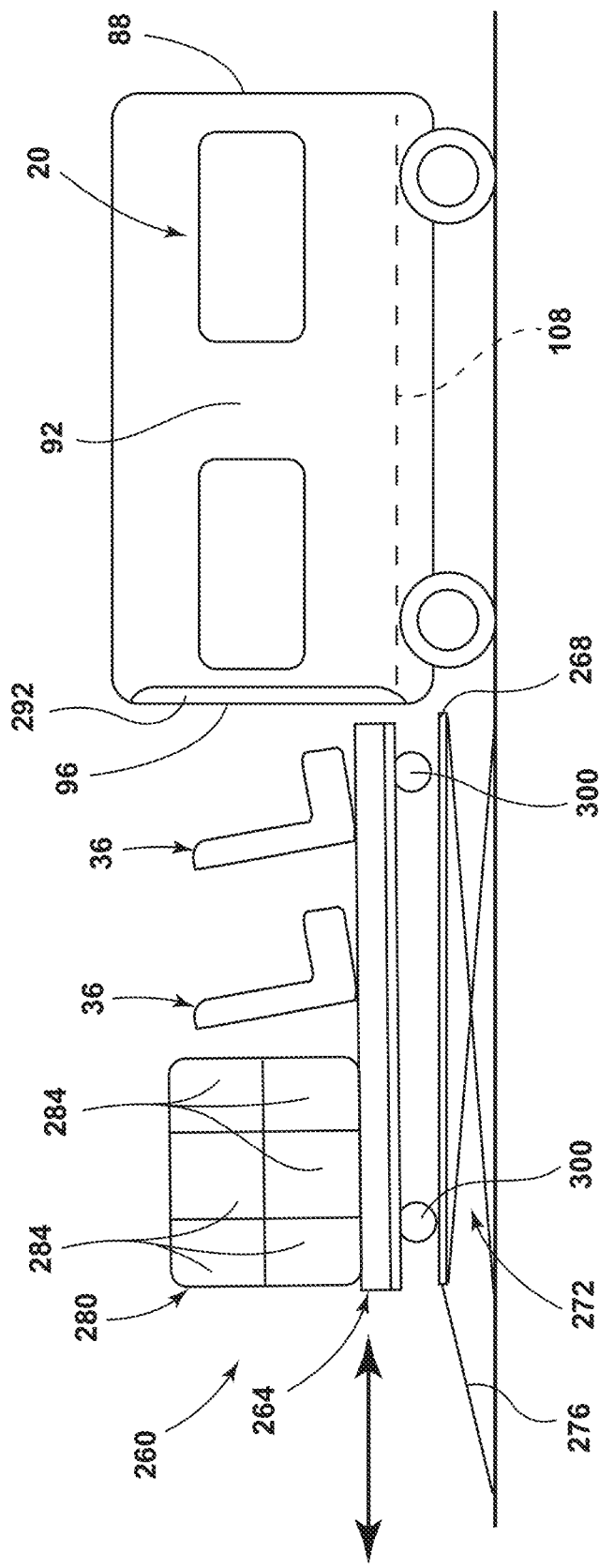
FIG. 15 is a side view of the vehicle and a lift assembly, illustrating a loading of components into the vehicle, according to one example.
Figure 16:
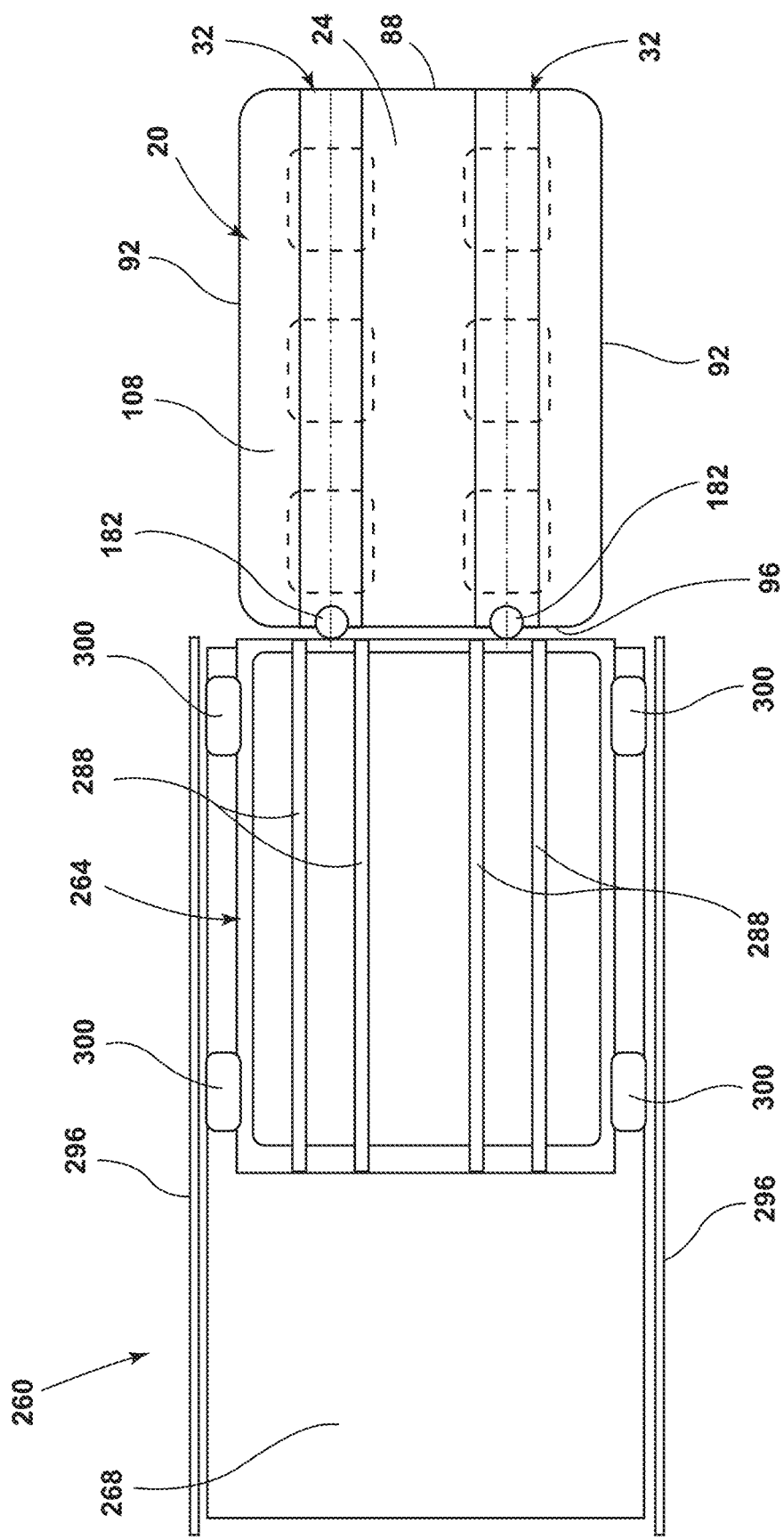
FIG. 16 is a top view of the vehicle and the lift assembly, illustrating a carriage assembly of the lift assembly, according to one example.

Referring to FIGS. 15 and 16, in various examples, the vehicle 20 may transition between various modes of operation, such as, primarily passenger-based operation, primarily cargo-based operation, and mixed or combined passenger and cargo operation. To facilitate the transition between the various modes of operation, a lift assembly 260 can be employed. The lift assembly 260 can be utilized to remove one or more components from the cabin 24 of the vehicle 20 and/or can be utilized to load one or more components on to the vehicle 20 from the lift assembly 260. For example, the lift assembly 260 can receive a carriage assembly 264 that can carry the one or more components that have been removed from the vehicle 20 and/or can carry the one or more components that are to be loaded into the vehicle 20. The carriage assembly 264 may be movable relative to a platform 268 of the lift assembly 260. The platform 268 may be a surface that supports the carriage assembly 264 and/or the components that are being removed from or loaded onto the vehicle 20. The platform 268 may be positioned between the carriage assembly 264 and an elevation assembly 272. The elevation assembly 272 can be utilized to adjust a vertical height of the platform 268 and/or the carriage assembly 264 such that the platform 268 and/or the carriage assembly 264 can be placed at an appropriate height to facilitate the transfer of components from the vehicle 20 to the lift assembly 260 and/or the transfer of components from the lift assembly 260 to the vehicle 20. The elevation assembly 272 can employ aerial lifts or vertical lifts to adjust a vertical height or elevation of the carriage assembly 264, the platform 268, and/or the components to be loaded or unloaded. For example, the elevation assembly 272 can employ scissor jacks, pistons, motors, pneumatics, hydraulics, and/or combinations thereof to accomplish its vertical adjustment capabilities. In various examples, the lift assembly 260 can include a ramp 276 that can be used to load the carriage assembly 264 onto the lift assembly 260 and to remove the carriage assembly 264 from the lift assembly 260. The ramp 276 may be operable between stowed and deployed positions.

Referring again to FIGS. 15 and 16, in various examples, the lift assembly 260 can be capable of lateral or horizontal movement in addition to the vertical adjustability provided by the elevation assembly 272. The lateral or horizontal movement of the lift assembly 260 may be enabled, for example, by wheels, rollers, pivot arms, or any other suitable approach that provides lateral or horizontal adjustability. In some examples, the lateral or horizontal movement can be provided by a cylinder assembly or piston assembly that is rotatably coupled to a base of the lift assembly 260 and an underside of the platform 268. In such an example, the coupling between the cylinder assembly or piston assembly and the lift assembly 260 can include brackets provided on the base and the underside of the platform 268 with which either end of the cylinder assembly or piston assembly engages. A retaining pin can pass through apertures at either end of the cylinder assembly or piston assembly and engage with the associated brackets of the lift assembly 260. Accordingly, the cylinder assembly or piston assembly can be actuated as a pivot arm that can induce or otherwise supply the lateral or horizontal adjustability. One or more of the cylinder assemblies or piston assemblies can be employed on a given lift assembly 260. In some examples, the platform 268 may be movably coupled to the lift assembly 260 in a horizontal direction. For example, the platform 268 may be extendably or otherwise slidably coupled to the remainder of the lift assembly 260. In one example, the platform 268 may be driven in a rack-and-pinion fashion relative to the remainder of the lift assembly 260 to provide the lateral or horizontal adjustability. Alternatively, additional sections of the platform 268 may be nested or otherwise placed in a retracted position within, beneath, or above a primary stationary surface of the platform 268. For example, the primary stationary surface of the platform 268 may remain constantly available to the carriage assembly 264 while the additional sections of the platform 268 are stored in a retracted position. The additional sections of the platform 268 may extend from the retracted position to an extended position that effectively increases an available surface area of the platform 268 such that a distance or gap between the lift assembly 260 and the vehicle 20 is decreased or bridged. In various examples, the lift assembly 260 may be provided with wheels or rollers that are either passive or motor-driven. Accordingly, the lift assembly 260 may be operated as a movable cart that can be rolled in the lateral or horizontal direction toward and away from the vehicle 20. One or more of the wheels or rollers may be capable of swiveling, castering, or otherwise rotating about a vertical axis to enable non-linear movements of the lift assembly 260 in the lateral or horizontal direction.

Referring further to FIGS. 15 and 16, the components that are removed from the vehicle 20 or the components that are to be loaded into the vehicle 20 can include, but are not limited to, the seating assemblies 36, storage units 280, and/or storage compartments 284. The storage units 280 can include one or more of the storage compartments 284. The components that are removed from the vehicle 20 or to be loaded into the vehicle 20 can be transferred to or from storage tracks 288 that are provided on the carriage assembly 264 or the platform 268. The storage tracks 288 can run an entire length of the carriage assembly 264 or the platform 268 (e.g., an entire length of the primary stationary surface of the platform 268). To facilitate transfer of the components between the storage tracks 288 and the vehicle 20, the storage tracks 288 can be aligned with one or more of the rail assemblies 32 that are positioned within the cabin 24 of the vehicle 20. In various examples, the storage tracks 288 can be the same as, or similar to, the structures depicted and/or described for the rail assemblies 32, including the drive assemblies that include the drive cable 56 and the drive arm 60. Alternatively, the storage tracks 288 can be provided with a different friction-drive assembly than that depicted for the rail assemblies 32. Regardless of the drive assembly specifically utilized, the components that are transferred to or from the storage tracks 288 can be actuated along the storage tracks 288 in a powered or motorized manner. Alternatively, the storage tracks 288 may be rails that are not powered, are not provided with a drive assembly, and/or are not provided with data capabilities. Such storage tracks 288 may be referred to as "dumb rails" as opposed to "smart rails" that may be provided with power, data, and/or drive assemblies. In such an example, a force may be applied by a user or a piece of equipment that is external to the lift assembly 260 to accomplish movement of the components along the storage tracks 288. In various examples, the components that are to be loaded into the cabin 24 of the vehicle 20 can enter the vehicle 20 through an access door 292 of the vehicle 20. The access door 292 can be a side door positioned on one of the sides 92 of the vehicle 20, a lift gate at the front 88 or rear 96 of the vehicle 20, or any other suitable access point that permits passage of the components between the cabin 24 and areas that are external to the vehicle 20.

Referring still further to FIGS. 15 and 16, the lift assembly 260 and/or the platform 268 may be provided with guide rails 296 that are positioned along a perimeter of opposing or parallel sides of the lift assembly 260 or the platform 268. The guide rails 296 can aid in the retention of the carriage assembly 264 as the carriage assembly 264 is actuated along the platform 268. For example, the guide rails 296 can prevent the carriage assembly 264 from falling off of the lift assembly 260 and/or can ensure that the carriage assembly 264 remains sufficiently in-line with the rail assemblies 32 of the vehicle 20 such that the storage tracks 288 and the rail assemblies 32 can accomplish the transfer of the components between the vehicle 20 and the lift assembly 260. In various examples, the carriage assembly 264 can be provided with one or more rollers or one or more wheels 300. The wheels 300 can be powered or passive (i.e., not powered). The wheels 300 can reduce the coefficient of friction of moving the carriage assembly 264 relative to the platform 268. For example, if the wheels 300 were not employed, then sliding friction can dictate the amount of force necessary to actuate the carriage assembly 264 relative to the platform 268. However, when the wheels 300 are employed, then rolling friction may dictate the amount of force necessary to actuate the carriage assembly 264 relative to the platform 268. Rolling friction is typically less than sliding friction, which results in a decrease in the force that must be exerted to actuate the carriage assembly 264 relative to the platform 268. Accordingly, users or equipment that is being utilized to actuate the carriage assembly 264 relative to the platform 268, including on-board equipment (e.g., motors that drive the wheels 300), can exert less force, power, and/or energy when actuating the carriage assembly 264.

Figure 17:
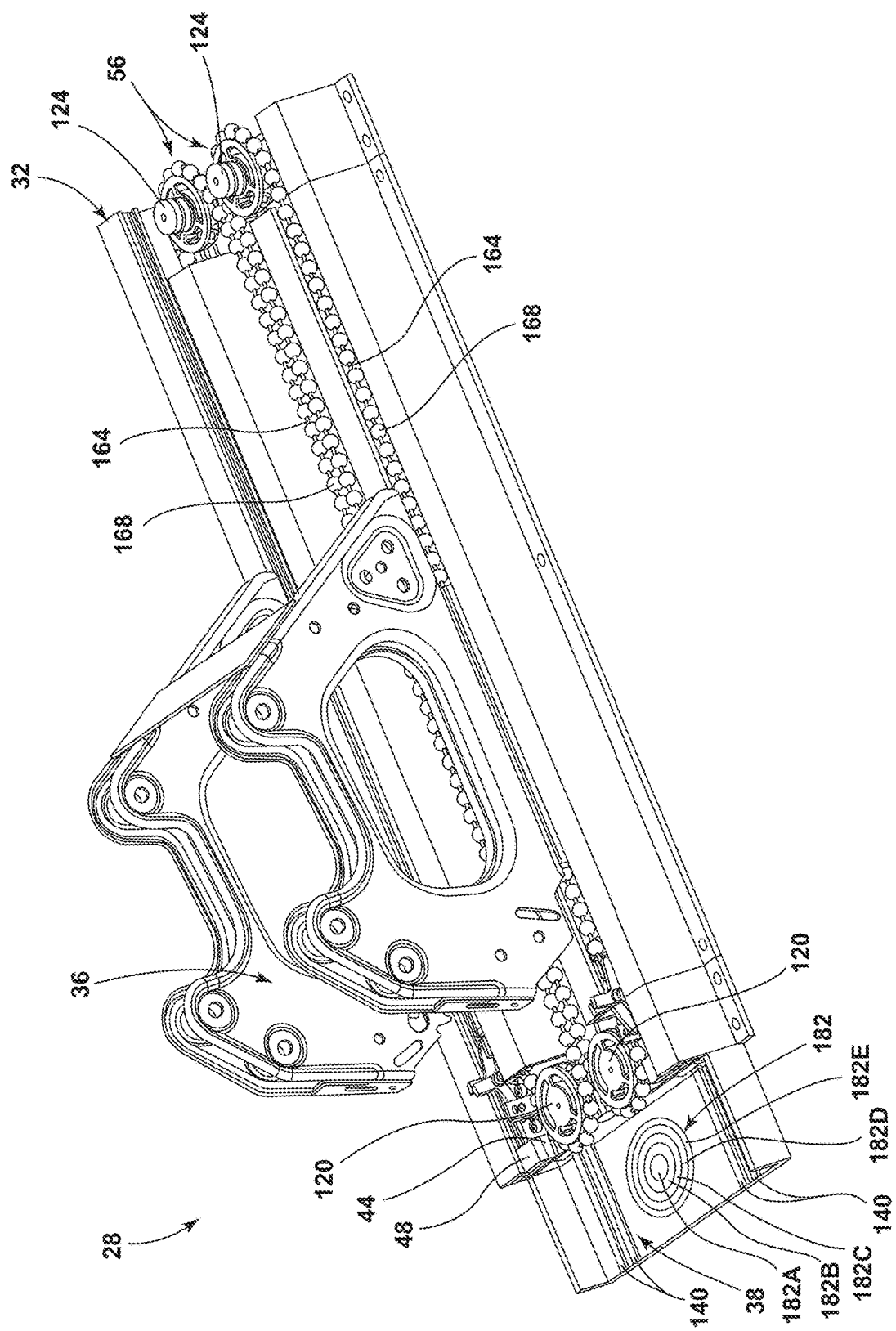
FIG. 17 is a side perspective view of the rail assembly, illustrating components of the seating assembly coupled to the rail assembly, according to one example.

Referring now to FIGS. 16 and 17, the rail assembly 32 can include the landing pad 38 with the coupling assembly 182 positioned on the landing pad 38. The landing pad 38 and the coupling assembly 182 can be utilized by the lift assembly 260 and/or the carriage assembly 264. The landing pad 38 may be provided with a cover that can be manually actuated or powered between opened and closed positions. For example, the cover can be biased toward the closed position (e.g., spring-biased) and powered to the open position (e.g., by a solenoid, by a motor, etc.). Accordingly, the coupling assembly 182 may be protected when the coupling assembly 182 is not being actively used. One specific example will now be described regarding the interaction between the landing pad 38, the coupling assembly 182, the lift assembly 260, and the carriage assembly 264. The lift assembly 260 can be actuated toward the rear 96 of the vehicle 20, such as toward an opened access door 292. The lift assembly 260 and/or the carriage assembly 264 can then engage with the landing pad 38 and/or the coupling assembly 182. For example, the platform 268 of the lift assembly 260 can approach the rear 96 of the vehicle 20 but not enter the cabin 24 of the vehicle 20. In such an example, the carriage assembly 264 can be actuated toward the vehicle 20 along the platform 268 until the carriage assembly 264 engages with the landing pad 38. Once the carriage assembly 264 has engaged with the landing pad 38, the carriage assembly 264 may continue to be actuated relative to the platform 268 until the carriage assembly 264 engages with the coupling assembly 182. For example, the locator portion 182A of the coupling assembly 182 can be engaged by a corresponding alignment portion of the carriage assembly 264. In one example, the locator portion 182A may be provided with a locator pin or locking pin that is extendable relative to the landing pad 38 and the locator pin or the locking pin may extend upwardly into the alignment portion of the carriage assembly 264. In such an example, the alignment portion of the carriage assembly 264 may engage with the receiving portion 182B prior to the engagement by the locator pin or the locking pin of the locator portion 182A. Alternatively, the locator portion 182A can be provided as a receptacle or aperture in the floor 108 of the vehicle 20 that can receive a locator pin or a locking pin of the lift assembly 260 or the carriage assembly 264. In either example, the lift assembly 260 and/or the carriage assembly 264 are secured to a portion of the cabin 24 of the vehicle 20, such as the landing pad 38. For example, the lift assembly 260 and/or the carriage assembly 264 can be secured to the portion of the cabin 24 of the vehicle 20 by engagement between a locking pin on the lift assembly 260 or the carriage assembly 264 with a receptacle on the landing pad 38 (e.g., the locator portion 182A of the coupling portion 182).

Referring again to FIGS. 16 and 17, when the lift assembly 260 and/or the carriage assembly 264 is/are secured to the landing pad 38, the lift assembly 260 and/or the carriage assembly 264 can be connected to a power supply of the vehicle 20 (e.g., a vehicle-mounted battery). The connection between the lift assembly 260 and/or the carriage assembly 264 can be accomplished by engagement of the lift assembly 260 and/or the carriage assembly 264 with the negative voltage carrier 182D and/or the positive voltage carrier 182E of the coupling portion 182. For example, the alignment portion of the lift assembly 260 and/or the carriage assembly 264 can be provided as a connector assembly or HUB assembly that corresponds with the structure and construction of the coupling portion 182. Accordingly, upon engagement of the alignment portion with the coupling portion 182, the locking pin or locator pin of the lift assembly 260 and/or the carriage assembly 264 can be inserted into the locator portion 182A at which point corresponding structures on the alignment portion of the lift assembly 260 and/or the carriage assembly 264 can be aligned with the receiving portion 182B, the data carrying portion 182C, the negative voltage carrier 182D, and/or the positive voltage carrier 182E. The receiving portion 182B can receive a sleeve or housing for the locking pin or locator pin in examples that provide the locking pin or locator pin as extend from the landing pad 38 or in examples where the locking pin or locator pin is provided on the lift assembly 260 and/or the carriage assembly 264. In some examples, the receiving portion 182B can be recessed relative to the immediately adjacent portions of the landing pad 38, such as the data carrying portion 182C, the negative voltage carrier 182D, the positive voltage carrier 182E, and/or a top surface or upper plane of the landing pad 38. Accordingly, in such examples, the alignment portion of the lift assembly 260 and/or the carriage assembly 264 may be retained in a lateral direction prior to the deployment of the locking pin or the locator pin such that the aligning portion can be ensured of a proper alignment with the coupling assembly 182 prior to the deployment of the locking pin or the locator pin. The data carrying portion 182C can establish a connection with the aligning portion of the lift assembly 260 and/or the carriage assembly 264 such that information or data signals can be exchanged or transmitted between the vehicle 20 and the lift assembly 260 and/or the carriage assembly 264. Data or information signals can include, but are not limited to, a current configuration of the cabin 24 of the vehicle 20, a current inventory of the components present in the cabin 24 of the vehicle 20, an identification code for the vehicle 20, an identification code for the lift assembly 260, an identification code for the carriage assembly 264, and/or a current inventory of components coupled to the lift assembly 260 and/or the carriage assembly 264.

Referring further to FIGS. 16 and 17, in some examples, the negative voltage carrier 182D and/or the positive voltage carrier 182E can be utilized by the lift assembly 260 and/or the carriage assembly 264 to provide power from the power supply of the vehicle 20 (e.g., vehicle-mounted battery) to power consuming components on the lift assembly 260 and/or the carriage assembly 264. For example, the power consuming components of the lift assembly 26 and/or the carriage assembly 264 can include, but are not limited to, motors, actuators, drive assemblies, lock assemblies, and/or the wheels 300 of the carriage assembly 300. In various examples, the lift assembly 260 may be coupled to a large power source (e.g., electrical grid via hardwiring to a building, a larger battery than the vehicle-mounted batteries, etc.) such that the negative voltage carrier 182D and/or the positive voltage carrier 182E may be utilized as a way of recharging the vehicle-mounted power source(s) while the components or being loaded and/or unloaded to/from the vehicle 20. The alignment portion of the lift assembly 260 and/or the carriage assembly 264 can be provided in a concentric ring configuration that resembles that of the coupling portion 182. However, the present disclosure is not so limited. Rather, alternative approaches can be employed that allow for securing of the lift assembly 260 and/or the carriage assembly 264 to the vehicle 20, transfer of power between the vehicle 20 and the lift assembly 260 and/or the carriage assembly 264, and/or transfer of data between the vehicle 20 and the lift assembly 260 and/or the carriage assembly 264. When the components to be loaded into the cabin 24 of the vehicle 20 are transferred into the vehicle 20, the components can be engaged with the rail assembly 32 and driven to traverse the cabin 24 to their intended or desired location. For example, on components that are equipped with the drive arm 60, the drive arm 60 can engage with the drive cable 56 at the first and second thicknesses 164, 168 and the drive cable 56 can be actuated by the rotors 120 of the motor(s) 112. In the depicted example, the seating assembly 36 is loaded into the rail assembly 32 and the drive cable 56 can be actuated such that the seating assembly 36 traverses the rail assembly 32 from the region proximate the rotors 120 toward the region proximate the pulleys 124.

Figure 18:
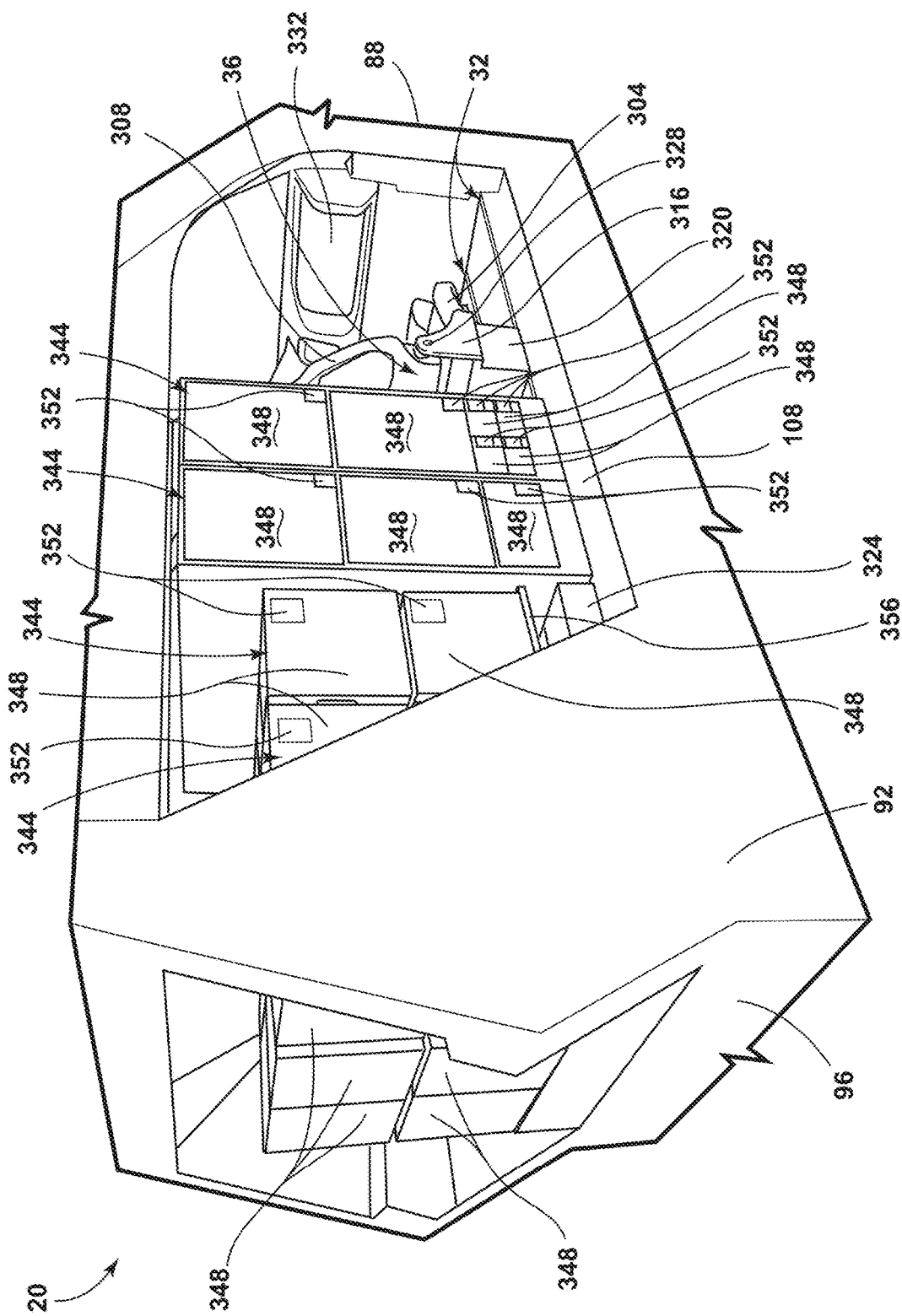
FIG. 18 is a rear perspective view of the cabin of the vehicle, illustrating a configuration of the seating assemblies and storage units, according to one example.
Figure 19:
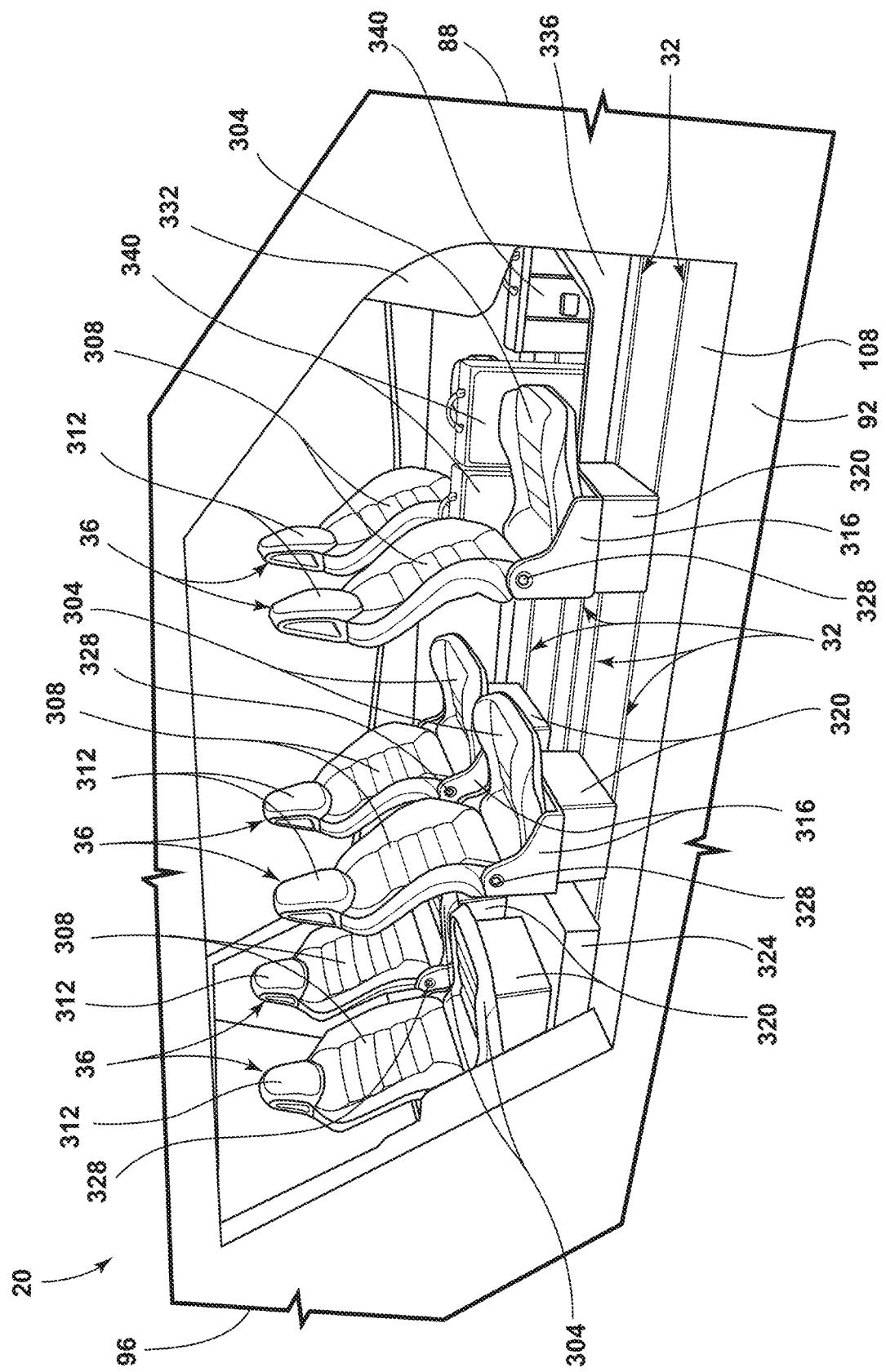
FIG. 19 is a side perspective view of a cabin of a vehicle, illustrating a configuration of seating assemblies, according to one example.

Referring to FIGS. 18 and 19, the cabin 24 of the vehicle 20 can be provided with one or more of the seating assemblies 36. The seating assemblies 36 can be positioned at various locations along the rail assemblies 32 within the cabin 24. The seating assemblies 36 are provided with a seat 304, a seatback 308, and/or a headrest 312. The seat 304 and the seatback 308 can be pivotably coupled to one another by way of a carrier 316. In some examples, the carrier 316 may be directly coupled to the rail assemblies 32 (e.g., by anchors). Alternatively, in various examples, the carrier 316 may be coupled to the rail assemblies 32 indirectly (e.g., by a base portion 320). In some examples, the seating assemblies 36 that are positioned at a rearward most location within the cabin 24 may be provided with an additional raised area 324 that is directly coupled to either the carrier 316 or the base portion 320. The raised area 324 can provide the rearward most seating assemblies 36 with additional vertical height relative to the remaining seating assemblies 36 to allow occupants of the rearward most seating assemblies 36 a better vantage point and more interesting view than if the seating assemblies 36 were all at about the same height. The raised area 324, in some examples, may couple a plurality of the seating assemblies 36 together. For example, the raised area 324 may provide a common riser or dais between two adjacent seating assemblies 36. The seating assemblies 36 can be positioned in a conventional first row, second row, and/or third row configuration as shown in FIG. 19. Alternatively, the seating assemblies 60 can be positioned in an unconventional manner. For example, one or more of the seating assemblies 36 may be placed in a stored position. When in the stored position, the seating assemblies 36 may be stored in a number of positions and/or locations. For example, the seating assemblies 36 may be forward-dumped such that the seatback 308 is generally horizontal and generally parallel with the seat 304 by pivoting the seatback 308 forward about a pivot point 328 of the carrier 316. When in the stored position, the seating assemblies 36 may be stored beneath a forward console 332 that is positioned proximate the front 88 of the vehicle 20. The seating assemblies 36 may be provided with a swivel functionality that allows the seating assemblies 36 to pivot about a vertical axis relative to the floor 108 of the vehicle 20. For example, the carrier 316 may be coupled to the floor 108 by a swivel assembly that permits pivotable motion of the seating assembly 36 about a vertical axis while maintaining engagement of the seating assembly 36 with the rail assembly 32. In some examples, where the base portion 320 is employed, the carrier 316 and the base portion 320 may be coupled to one another in a manner that permits the pivotable motion of the seating assembly 36 about the vertical axis while maintaining the engagement of the seating assembly 36 with the rail assembly(ies) 32. For example, the base portion 320 may remain coupled to the rail assembly(ies) 32 and rotationally stationary relative to the rail assembly(ies) 32 while the carrier 316 and the seating assembly 36 pivot or rotate about the vertical axis relative to the rail assembly(ies) 32. In examples where the raised area 324 is employed, the raised area 324 may remain coupled to the rail assembly(ies) 32 and rotationally stationary relative to the rail assembly(ies) 32 while the seating assembly 36, the carrier 316, and/or the base portion 320 are capable of pivoting or rotating about the vertical axis relative to the rail assembly(ies). In various examples, a central console 336 may be provided in a location between at least some of the seating assemblies 36 that are laterally adjacent to one another. The central console 336 may generally extend along a longitudinal axis, or travel axis, of the vehicle 20. The central console 336 can be provided with a number of functionalities, such as storing of luggage 340, providing electrical connections for electrical devices, providing data connections for interaction with the vehicle 20, and/or other convenience and comfort functionalities. The configuration illustrated in FIG. 18 may be referred to as a cargo arrangement or primarily cargo based. In some cargo transport examples, such as that shown in FIG. 18, one or more of the seating assemblies 36 may remain available for occupants that are traveling with the cargo items (e.g., vehicle operators, vehicle monitors, security personnel, etc.). The configuration illustrated in FIG. 19 may be referred to as passenger arrangements or primarily passenger based where the vehicle is primarily being used to transport passengers and their accompanying cargo items. The configuration illustrated in FIGS. 18 and 19 are exemplary in nature and are not intended to limit the scope of the present disclosure.

Referring again to FIGS. 18 and 19, in some cargo transport configurations unused seating assemblies 36 may be removed from the cabin 24 of the vehicle 20 to make room for cargo items to be stored within the cabin 24 while maintaining one or more of the seating assemblies 36 as available for occupants. The cargo items may be stored in storage units 344 that are placed within the cabin 24. The storage units 344 may engage with the rail assembly(ies) 32 such that the storage units 344 are prevented from unintentional motion during maneuvering of the vehicle 20. The storage units 344 may also receive power from the rail assembly 32 and/or communicate data between the storage units 344 and the vehicle 20 by way of one or more transceivers. The power and/or data communication provided to the storage units 344 may be used for temperature control of one or more storage compartments 348 within the storage units 344, for lighting the storage compartments 348, for locking/unlocking the storage compartments 348, for actuating a door of the storage compartments 348, for actuating the storage units 344 along the rail assembly 32, and/or for monitoring contents of the storage compartments 348 (e.g., sensors, imagers, etc.). The storage compartments 348 may be provided with latch assemblies 352 that can be actuated manually or automatically to provide access to an interior of the storage compartments 348. The storage compartments 348 can be accessed from one of the sides 92 or the rear 96 of the vehicle 20. Storage units 344 that are accessible from the rear 96 of the vehicle 20 may be positioned on a rear surface 356 of rearward most seating assemblies 36 when the rearward most seating assemblies 36 are placed in a stowed or fold-flat position. When storage units 344 are placed on the rear surfaces 356 of the rearward most seating assemblies 36, these storage units 344 may not be secured to the vehicle 20 by way of the rail assemblies 32. Alternatively, the storage units 344 that are placed on the rear surfaces 356 of the rearward most seating assemblies 36 may be secured to the vehicle 20 by interaction with various components of the cabin 24 of the vehicle 20. For example, the storage units 344 that are placed on the rear surfaces 356 of the rearward most seating assemblies 36 may be secured to the vehicle 20 by interacting with the storage units 344 that are secured to the rail assemblies 32, by tethering or anchoring to tie downs within a cargo area of the cabin 24, and/or by other suitable approaches.

Referring to FIG. 20, a method of loading components into a vehicle 400 can include step 404 of opening the access door 292 to gain access to the cabin 24 of the vehicle 20. The method of loading components into a vehicle 400 can also include step 408 of actuating the lift assembly 260 to the open access door 292. In various examples, the lift assembly 260 can be provided with components to be loaded into the vehicle 20. Additionally, the method of loading components into a vehicle 400 can include step 412 of securing the lift assembly 260 to a portion of the cabin 24 of the vehicle 20. For example, the lift assembly 260 can be secured to the landing pad 38 of the rail assembly 32 by the coupling assembly 182. Further, the method of loading components into a vehicle 400 can include step 416 of transferring the components to be loaded into the vehicle 20 from the lift assembly 260 to the cabin 24 of the vehicle 20. In various examples, the step 416 of transferring the components to be loaded into the vehicle 20 from the lift assembly 260 to the cabin 24 of the vehicle 20 may further include a step of actuating the carriage assembly 264 relative to the platform 268 of the lift assembly 260. In some examples, the step 416 of transferring the components to be loaded into the vehicle 20 from the lift assembly 260 to the cabin 24 of the vehicle 20 can include the step of actuating the components to be loaded into the cabin 24 of the vehicle 20 along the storage tracks 288 of the carriage assembly 264. The step 416 of transferring the components to be loaded into the vehicle 20 from the lift assembly 260 to the cabin 24 of the vehicle 20 can include the step of aligning the storage tracks 288 of the carriage assembly 264 with the rail assembly 32 the cabin 24 of the vehicle 20. In various examples, the step of actuating the carriage assembly 264 relative to the platform 268 of the lift assembly 260 can also include the step of guiding the actuation of the carriage assembly 264 relative to the platform 268 with the guide rails 296 of the platform 268. In some examples, the step 416 of transferring the components to be loaded into the vehicle 20 from the lift assembly 260 to the cabin 24 of the vehicle 20 can include the step of transferring the components to be loaded into the vehicle 20 from the storage tracks 288 of the lift assembly 260 to at least one track of the rail assembly 32 of the cabin 24 of the vehicle 20. In various examples, the step 416 of transferring the components to be loaded into the vehicle 20 from the lift assembly 260 to the cabin 24 of the vehicle 20 can further include the step of engaging one or more of the components to be loaded into the vehicle 20 with the drive cable 56 of the rail assembly 32 in the cabin 24 of the vehicle 20. In some examples, the step 412 of securing the lift assembly 260 to a portion of the cabin 24 of the vehicle 20 can include the step of inserting a locking pin or a locator pin into a receptacle on the landing pad 38 of the rail assembly 32 of the cabin 24 of the vehicle 20. In examples, the step 412 of securing the lift assembly 260 to a portion of the cabin 24 of the vehicle 20 can include the step of connecting the lift assembly 260 to a power supply of the vehicle 20 (e.g., a vehicle-mounted battery). The step 416 of transferring the components to be loaded into the vehicle 20 from the lift assembly 260 to the cabin 24 of the vehicle 20 can include, in various examples, the step of transferring the components to be loaded into the vehicle 20 directly onto longitudinal tracks of the cabin 24 of the vehicle 20. The step 412 of securing the lift assembly 260 to a portion of the cabin 24 of the vehicle 20 can include the step of connecting the lift assembly 260 to a data transfer point of the vehicle 20 (e.g., the data carrying portion 182C of the coupling assembly 182). The step of connecting the lift assembly 260 to a data transfer point of the vehicle can include the step of reading an electronic data tag of the lift assembly 260. The electronic data tag can provide information about the contents of the lift assembly 260 and/or the carriage assembly 264. For example, the electronic data tag can provide data or information relating to a current inventory of the components present in on the lift assembly 260 and/or the carriage assembly 264, an identification code for the lift assembly 260, and/or an identification code for the carriage assembly 264. The step of reading an electronic data tag of the lift assembly 260 can include the step of referencing the components to be loaded into the vehicle 20 against an assigned configuration for the vehicle 20.

Referring now to FIG. 21, a method of exchanging components of the vehicle 500 can include step 504 of opening the access door 292 to gain access to the cabin 24 of the vehicle 20. The method 500 can also include step 508 of actuating a first lift assembly 260 to the open access door 292 by movement of the first lift assembly 260 in at least one of a horizontal and a vertical direction. Once the first lift assembly 260 has been actuated to the open access door 292 of the vehicle 20, the method 500 can advance to step 512 of securing the first lift assembly 260 to the landing pad 38 of the rail assembly 32 of the cabin 24 of the vehicle 20. Next, the method 500 can advance to step 516 of transferring one or more components to be removed from the cabin 24 of the vehicle 20 from the rail assembly 32 in the cabin 24 of the vehicle 20 to the first lift assembly 260 through the open access door 292. Next, the method 500 can advance to step 520 of actuating the first lift assembly 260 to a location that is removed from an immediate proximity of the open access door 292 of the vehicle 20. Once the first lift assembly 260 has been actuated to the location that is removed from the immediate proximity of the open access door 292 of the vehicle 20, the method 500 may advance to the step 524 of actuating a second lift assembly 260 to the open access door 292 by movement of the second lift assembly 260 in at least one of the horizontal direction and the vertical direction. The second lift assembly 260 may be provided with one or more components to be loaded into the cabin 24 of the vehicle 20. Once the second lift assembly 260 has been actuated to the open access door 292 of the vehicle 20, the method 500 may advance to step 528 of securing the second lift assembly 260 to the landing pad 38 of the rail assembly 32 of the cabin 24 of the vehicle 20. Next, in various examples, the method 500 may advance to step 532 of actuating the carriage assembly 264 relative to the platform 268 of the second lift assembly 260 in a direction that is toward the cabin 24 of the vehicle 20. Next, the method 500 may advance to step 536 of transferring the one or more components to be loaded into the vehicle 20 from the second lift assembly 260 to the cabin 24 of the vehicle 20. In various examples, the step 536 of transferring the one or more components to be loaded into the vehicle 20 from the second lift assembly 260 to the cabin 24 of the vehicle 20 can include the step of transferring the one or more components to be loaded into the vehicle 20 from the storage tracks 288 of the carriage assembly 264 to at least one track of the rail assembly 32 of the cabin 24 of the vehicle 20. In some examples, step 532 of actuating the carriage assembly 264 relative to the platform 268 of the second lift assembly 260 in a direction that is toward the cabin 24 of the vehicle 20 can include the step of guiding the actuation of the carriage assembly 264 relative to the platform 268 with guide rails 296 of the platform 268. The step 536 of transferring the one or more components to be loaded into the vehicle 20 from the second lift assembly 260 to the cabin 24 of the vehicle 20 can include the step of engaging the components to be loaded into the vehicle 20 with the drive cable 56 of the rail assembly 32 in the cabin 24 of the vehicle 20. In various examples, the step 528 of securing the second lift assembly 260 to the landing pad 38 of the rail assembly 32 of the cabin 24 of the vehicle 20 can include the step of inserting a locking pin or locator pin into a receptacle on the landing pad 38 of the rail assembly 32 of the cabin 24 of the vehicle 20, connecting the second lift assembly 260 to a power supply of the vehicle 20, and connecting the second lift assembly 260 to a data transfer point of the vehicle 20 (e.g., data carrying portion 182C). The step of connecting the second lift assembly 260 to a data transfer point of the vehicle 20 can also include the step of reading an electronic data tag of the second lift assembly 260. In various examples, the step of reading an electronic data tag of the second lift assembly 260 can include the step of referencing the components to be loaded into the vehicle 20 against an assigned configuration for the vehicle 20. The assigned configuration can be stored in one or more controllers on the vehicle 20, on a vehicle distribution network that is external to the vehicle 20, on the lift assembly 260, and/or on other suitable locations that can be communicated with to determine if the assigned configuration has been met. In various examples, the assigned configuration can include specific position and/or location information about where the various components are intended to be within the cabin 24 as well as relative to one another. Additionally or alternatively, the assigned configuration can provide more generic information relative to whether the vehicle 20 is configured as a primarily passenger-based configuration, a primarily cargo-based configuration, or a mixed or combined passenger-and-cargo-based configuration.

With the development of vehicles 20, especially autonomous vehicles, new challenges have been realized with the normal operation of the autonomous vehicles. For example, one challenge includes the configuring of the cabin 24 of the vehicle 20 when no occupants are present to execute the configuring. Accordingly, the present disclosure provides one or more examples of solutions to the autonomous configuring of the cabin 24 of the vehicle 20 that can also be adjusted by a user that is physically occupying the cabin 24, Additionally, the present disclosure provides for the autonomous transition of the vehicle 20 between a passenger vehicle to a cargo vehicle and back again. Accordingly, the vehicle 20 may have less "down-time" when the vehicle 20 is not being utilized and can result in fewer vehicles 20 being needed on the roads.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A method of loading components into a vehicle, the method comprising the steps of:
    opening an access door to gain access to a cabin of the vehicle;
    actuating a lift assembly to the open access door, wherein the lift assembly is provided with components to be loaded into the vehicle;
    securing the lift assembly to a portion of the cabin of the vehicle;
    connecting the lift assembly to a power supply of the vehicle; and
    transferring the components to be loaded into the vehicle from the lift assembly to the cabin of the vehicle.

2. The method of loading components into a vehicle of claim 1, wherein the step of transferring the components to be loaded into the vehicle from the lift assembly to the cabin of the vehicle further comprises the step of actuating a carriage assembly relative to a platform of the lift assembly.

3. The method of loading components into a vehicle of claim 2, wherein the step of transferring the components to be loaded into the vehicle from the lift assembly to the cabin of the vehicle further comprises the step of actuating the components to be loaded into the cabin of the vehicle along storage tracks of the carriage assembly.

4. The method of loading components into a vehicle of claim 2, wherein the step of transferring the components to be loaded into the vehicle from the lift assembly to the cabin of the vehicle further comprises the step of aligning storage tracks of the carriage assembly with a rail assembly of the cabin of the vehicle.

5. The method of loading components into a vehicle of claim 2, wherein the step of actuating a carriage assembly relative to a platform of the lift assembly further comprises the step of guiding the actuation of the carriage assembly relative to the platform with guide rails of the platform.

6. The method of loading components into a vehicle of claim 1, wherein the step of transferring the components to be loaded into the vehicle from the lift assembly to the cabin of the vehicle further comprises the step of transferring the components to be loaded into the vehicle from storage tracks of the lift assembly to at least one track of a rail assembly of the cabin of the vehicle.

7. The method of loading components into a vehicle of claim 1, wherein the step of transferring the components to be loaded into the vehicle from the lift assembly to the cabin of the vehicle further comprises the step of engaging one or more of the components to be loaded into the vehicle with a drive cable of a rail assembly in the cabin of the vehicle.

8. The method of loading components into a vehicle of claim 1, wherein the step of securing the lift assembly to a portion of the cabin of the vehicle further comprises the step of inserting a locking pin into a receptacle on a landing pad of a rail assembly of the cabin of the vehicle.

9. The method of loading components into a vehicle of claim 1, wherein the step of transferring the components to be loaded into the vehicle from the lift assembly to the cabin of the vehicle further comprises the step of transferring the components to be loaded into the vehicle directly onto longitudinal tracks of the cabin of the vehicle.

10. The method of loading components into a vehicle of claim 1, wherein the step of securing the lift assembly to a portion of the cabin of the vehicle further comprises the step of connecting the lift assembly to a data transfer point of the vehicle.

11. The method of loading components into a vehicle of claim 10, wherein the step of connecting the lift assembly to a data transfer point of the vehicle comprises the step of reading an electronic data tag of the lift assembly.

12. The method of loading components into a vehicle of claim 11, wherein the step of reading an electronic data tag of the lift assembly comprises the step of referencing the components to be loaded into the vehicle against an assigned configuration for the vehicle.

13. A method of exchanging components of a vehicle, the method comprising the steps of:
    opening an access door to gain access to a cabin of the vehicle;
    actuating a first lift assembly to the open access door by movement of the first lift assembly in at least one of a horizontal and a vertical direction;
    securing the first lift assembly to a landing pad of a rail assembly of the cabin of the vehicle;
    transferring one or more components to be removed from the cabin of the vehicle from the rail assembly in the cabin of the vehicle to the first lift assembly through the open access door;
    actuating the first lift assembly to a location that is removed from an immediate proximity of the opened access door of the vehicle;
    actuating a second lift assembly to the open access door by movement of the second lift assembly in at least one of the horizontal direction and the vertical direction, wherein the second lift assembly is provided with one or more components to be loaded into the cabin of the vehicle;
    securing the second lift assembly to the landing pad of the rail assembly of the cabin of the vehicle;

inserting a locking pin into a receptacle on the landing pad of the rail assembly of the cabin of the vehicle;

connecting the second lift assembly to a power supply of the vehicle;

connecting the second lift assembly to a data transfer point of the vehicle;

actuating a carriage assembly relative to a platform of the second lift assembly in a direction that is toward the cabin of the vehicle; and transferring the one or more components to be loaded into the vehicle from the second lift assembly to the cabin of the vehicle.

14. The method of exchanging components of a vehicle of claim 13, wherein the step of transferring the one or more components to be loaded into the vehicle from the second lift assembly to the cabin of the vehicle further comprises the step of transferring the one or more components to be loaded into the vehicle from storage tracks of the carriage assembly to at least one track of the rail assembly of the cabin of the vehicle.

15. The method of loading components into a vehicle of claim 13, wherein the step of actuating a carriage assembly relative to a platform of the second lift assembly in a direction that is toward the cabin of the vehicle further comprises the step of guiding the actuation of the carriage assembly relative to the platform with guide rails of the platform.

16. The method of loading components into a vehicle of claim 13, wherein the step of transferring the one or more components to be loaded into the vehicle from the second lift assembly to the cabin of the vehicle further comprises the step of engaging the components to be loaded into the vehicle with a drive cable of the rail assembly in the cabin of the vehicle.

17. The method of loading components into a vehicle of claim 16, wherein the step of connecting the second lift assembly to a data transfer point of the vehicle comprises the step of reading an electronic data tag of the second lift assembly.

18. The method of loading components into a vehicle of claim 17, wherein the step of reading an electronic data tag of the second lift assembly comprises the step of referencing the components to be loaded into the vehicle against an assigned configuration for the vehicle.

19. A method of loading components into a vehicle, the method comprising the steps of:

opening an access door to gain access to a cabin of the vehicle;

actuating a lift assembly to the open access door, wherein the lift assembly is provided with components to be loaded into the vehicle;

securing the lift assembly to a portion of the cabin of the vehicle;

connecting the lift assembly to a data transfer point of the vehicle; and transferring the components to be loaded into the vehicle from the lift assembly to the cabin of the vehicle.

20. The method of loading components into a vehicle of claim 19, wherein the step of transferring the components to be loaded into the vehicle from the lift assembly to the cabin of the vehicle further comprises the step of transferring the components to be loaded into the vehicle from storage tracks of the lift assembly to at least one track of a rail assembly of the cabin of the vehicle.

\* \* \* \* \*